United States Patent
Kim et al.

(10) Patent No.: US 9,626,102 B2
(45) Date of Patent: Apr. 18, 2017

(54) METHOD FOR CONTROLLING SCREEN AND ELECTRONIC DEVICE THEREOF

(71) Applicant: Samsung Electronics Co., Ltd., Suwon-si, Gyeonggi-do (KR)

(72) Inventors: Se-Hoon Kim, Haenam-gun (KR); Ye-Ni Lee, Suwon-si (KR); Jong-Pil Yi, Hwaseong-si (KR); Ji-Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 300 days.

(21) Appl. No.: 14/565,991

(22) Filed: Dec. 10, 2014

(65) Prior Publication Data

US 2015/0169141 A1      Jun. 18, 2015

(30) Foreign Application Priority Data

Dec. 16, 2013   (KR) .................. 10-2013-0156364

(51) Int. Cl.
*G06F 3/0488* (2013.01)
*G06F 3/0482* (2013.01)
*G06F 3/0484* (2013.01)

(52) U.S. Cl.
CPC ........ *G06F 3/04883* (2013.01); *G06F 3/0482* (2013.01); *G06F 3/04842* (2013.01)

(58) Field of Classification Search
CPC . G06F 3/04883; G06F 3/0482; G06F 3/04842
See application file for complete search history.

(56) References Cited

U.S. PATENT DOCUMENTS

| | | | | |
|---|---|---|---|---|
| 7,327,349 B2 * | 2/2008 | Robbins | ................ | G06F 3/0481 345/156 |
| 7,526,316 B2 * | 4/2009 | Shimizu | .............. | G06F 3/04892 345/156 |
| 8,902,187 B2 * | 12/2014 | Han | ........................ | G06F 3/041 345/156 |
| 2005/0283734 A1 * | 12/2005 | Santoro | ................. | G06F 3/0481 715/765 |
| 2009/0070670 A1 * | 3/2009 | Kishi | .................. | G06F 3/04886 715/702 |

(Continued)

FOREIGN PATENT DOCUMENTS

KR    10-2012-0016729 A    2/2012
KR    10-2013-0052416 A    5/2013

*Primary Examiner* — Omar Abdul-Ali
(74) *Attorney, Agent, or Firm* — Jefferson IP Law, LLP

(57) ABSTRACT

A method for controlling a screen of an electronic device is provided. The method includes displaying a plurality of subscreens by dividing a screen, the plurality of subscreens comprising an overlapping region of a certain area with a neighboring subscreen, selecting one of the plurality of subscreens, displaying the selected one of the plurality of subscreen in a mirroring region, and displaying, when receiving a user drag from the selected one of the plurality of subscreens displayed in the mirroring region to a neighboring screen comprising the overlapping region with the selected one of the plurality of subscreens, the neighboring screen comprising the overlapping region with the selected one of the plurality of subscreens, in the mirroring region according to the drag.

21 Claims, 23 Drawing Sheets

(56) References Cited

U.S. PATENT DOCUMENTS

| | | | |
|---|---|---|---|
| 2009/0091547 A1* | 4/2009 | Kikuoka | G06F 3/04886 345/173 |
| 2011/0302534 A1* | 12/2011 | Ooguchi | G06F 3/04886 715/830 |
| 2012/0044164 A1 | 2/2012 | Kim et al. | |
| 2012/0096343 A1* | 4/2012 | Beck | G06F 3/0484 715/243 |
| 2013/0120292 A1 | 5/2013 | Gwak | |
| 2013/0237288 A1 | 9/2013 | Lee | |

\* cited by examiner

METHOD FOR CONTROLLING SCREEN AND ELECTRONIC DEVICE THEREOF

CROSS-REFERENCE TO RELATED APPLICATION(S)

This application claims the benefit under 35 U.S.C. §119(a) of a Korean patent application filed on Dec. 16, 2013 in the Korean Intellectual Property Office and assigned Serial number 10-2013-0156364, the entire disclosure of which is hereby incorporated by reference.

TECHNICAL FIELD

The present disclosure relates to a method for controlling screen and an electronic device thereof.

BACKGROUND

With advances in information communication technology and semiconductor technology, various electronic devices are advancing to multimedia devices for providing various multimedia services. For example, the electronic device provides various multimedia services such as messenger service, broadcasting service, wireless Internet service, camera service, and music play service.

For the portability, the electronic devices are getting slimmer and lighter and include a touch screen for touch input. Since users want a large screen, the electronic devices including the touch screen are getting bigger.

However, while the user of the electronic device desires to control the electronic device with one hand, it is difficult to control the screen due to the large screen of the electronic device. In this regard, the electronic device needs to satisfy the one-handed control by the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure to provide a screen control method for controlling an entire screen using a subscreen in an electronic device, and the electronic device thereof.

Another aspect of the present disclosure is to provide a screen control method for controlling an entire screen with one hand in an electronic device, and the electronic device thereof.

Another aspect of the present disclosure is to provide a screen control method for effectively utilizing a large screen in an electronic device, and the electronic device thereof.

In accordance with an aspect of the present disclosure, a method for controlling a screen of an electronic device is provided. The method includes displaying a plurality of subscreens by dividing a screen, the plurality of subscreens comprising an overlapping region of a certain area with a neighboring subscreen, selecting one of the plurality of subscreens, displaying the selected one of the plurality of subscreens in a mirroring region, and displaying, when receiving a user drag from the selected one of the plurality of subscreens displayed in the mirroring region to a neighboring screen comprising the overlapping region with the selected one of the plurality of subscreens, the neighboring screen comprising the overlapping region with the selected one of the plurality of subscreens, in the mirroring region according to the drag.

In accordance with another aspect of the present disclosure, an electronic device is provided. The electronic device includes a touch screen, a memory, and a processor configured to display a plurality of subscreens by dividing a screen, the plurality of subscreens comprising an overlapping region of a certain area with a neighboring subscreen, to select one of the plurality of subscreens, to display the selected one of the plurality of subscreens in a mirroring region, and to display, when receiving a user drag from the selected one of the plurality of subscreens displayed in the mirroring region to aneighboring screen comprising the overlapping region with the selected one of the plurality of subscreens, to display the neighboring screen comprising the overlapping region with the selected one of the plurality of subscreen, in the mirroring region according to the drag.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
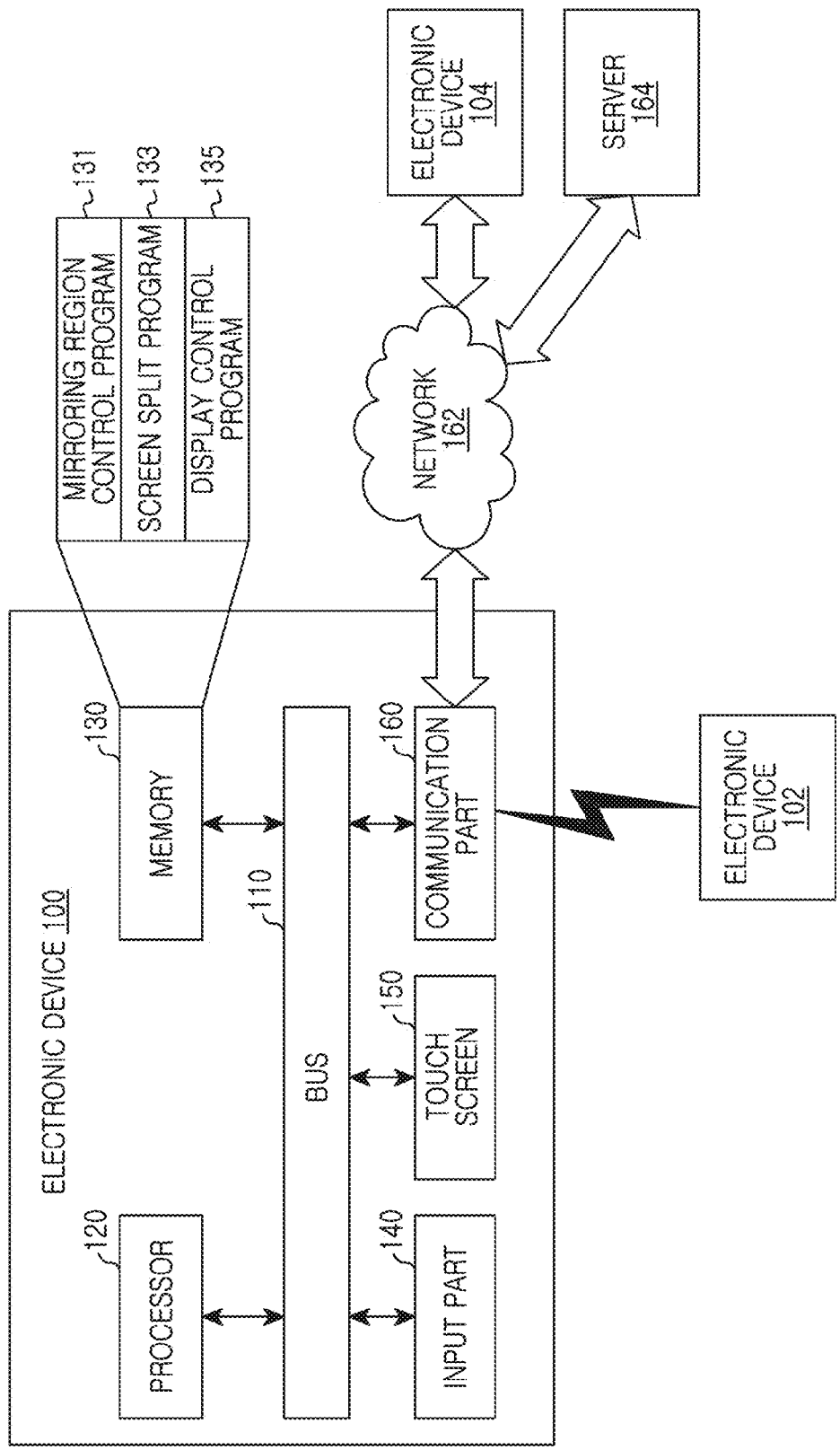
FIG. 1 is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An electronic device according to the present disclosure may include one or more of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, an accessory, an electronic appcessory, a camera, a wearable device, a wrist watch, a refrigerator, an air conditioner, a vacuum cleaner, an artificial intelligence robot, a television (TV), a Digital Versatile Disc (DVD) player, an audio system, an oven, a microwave oven, a washing machine, an electronic bracelet, an electronic necklace, an air purifier, a digital frame, medical appliances, a navigation device, a Global Positioning System (GPS) receiver, an Event Data Recorder (EDR), a Flight Data Recorder (FDR), a set-top box, a TV box, an electronic dictionary, an in-vehicle infotainment, electronic equipment for ship, avionics, a security device, an e-textile, a digital key, a camcorder, a game console, a Head Mounted Display (HMD), a flat panel display device, an electronic album, part of furniture or building/structure having the communication function, an electronic board, an electronic sign input device, and a projector. Those skilled in the art shall understand that the electronic device of the present disclosure is not limited those devices.

FIG. 1 is a block diagram of an electronic device according to an embodiment of the present disclosure.

Referring to FIG. 1, the electronic device 100 may include a bus 110, a processor 120, a memory 130, an input part 140, a touch screen 150, and a communication part 160, but is not limited thereto.

The bus 110 may interlink the components (e.g., the processor 120, the memory 130, the input part 140, the touch screen 150, and the communication part 160) of the electronic device 100 and transferring communication between the components.

The processor 120 may receive an instruction from the components of the electronic device 100 via the bus 110, interpret the received instruction, and perform an operation or a data processing according to the interpreted instruction. The processor 120 controls to execute at least one program stored in the memory 130 and to provide a service corresponding to the program. For example, the processor 120 may execute a mirroring region control program 131, a screen split program 133, and a display control program 135 to display a plurality of subscreens by splitting the screen, to select one of the subscreens, to display the selected subscreen in a mirroring region, and when receiving a user drag from the subscreen displayed in the mirroring region to a neighboring screen including an overlapping region with the subscreen, to display the neighboring screen including the overlapping region with the subscreen in the mirroring region according to the drag.

The processor 120 may include one or more Application Processor (APs) (not shown) and one or more Communication Processors (CPs) (not shown). Herein, the AP and the CP may be included in the processor 120 or in different Integrated Circuit (IC) packages. The AP and the CP may be included in a single IC package.

The AP may control hardware or software components connected to the AP by driving an operating system and/or an application program, and carry out data processing and operations including multimedia data. Herein, the AP may be implemented using a System on Chip (SoC). The CP may perform at least part of the multimedia control function.

The CP may identify and authenticate a terminal in a communication network using a Subscriber Identity Module (SIM) card. In so doing, the CP may provide the user with the service including voice telephony, video telephony, text message, and packet data. The CP may control the data transmission and reception of the communication part 160.

The AP or the CP may load and process the instruction and/or the data received from its non-volatile memory or at least one of the other components, in a volatile memory. The AP or the CP may store data received from or generated by at least one of the other components, in the non-volatile memory. The CP may manage data links and convert the communication protocol in the communication between the electronic device 100 including the hardware and the other electronic devices connected over the network. Herein, the CP may be implemented using a SoC. Additionally, the processor 120 may further include a Graphics Processing Unit (GPU).

The memory 130 may store the instruction and/or the data received from or generated by one or more components (e.g., the processor 120, the input part 140, the touch screen 150, and the communication part 160) of the electronic device 100.

The memory 130 stores one or more programs for the service of the electronic device 100. For example, the memory 130 may include the mirroring region control program 131, the screen split program 133, and the display control program 135. Each program may include a program module, and the program module may be implemented using software, firmware, and hardware, or a combination of at least two of them.

The mirroring region control program 131 may include at least one software component for determining one of the subscreens to display in the mirroring region. For example, the mirroring region control program 131 may display an icon corresponding to the other subscreen not displayed in the mirroring region, around the mirroring region. When the displayed icon is selected, the mirroring region control program 131 may control to display the subscreen corresponding to the selected icon in the mirroring region.

For example, the mirroring region control program 131 may detect the touch during a reference time around the mirroring region. The mirroring region control program 131 may display an object corresponding to the multiple subscreens at the detected touch point. When the displayed object is selected, the mirroring region control program 131 may control to display the subscreen corresponding to the selected object in the mirroring region.

For example, the mirroring region control program 131 may detect a vertical drag in a certain region of the mirroring region. The mirroring region control program 131 may control to display the corresponding subscreen in the mirroring region according to a movement distance of the detected drag.

For example, the mirroring region control program 131 may determine whether the user's drag moves from the one subscreen displayed in the mirroring region to the overlapping region. The electronic device user may drag the screen displayed in the mirroring region to a certain distance. When receiving the user drag from the one subscreen displayed in the mirroring region to a neighboring screen including the overlapping region with the subscreen, the mirroring region control program 131 may display the neighboring screen including the overlapping region with the one subscreen, in the mirroring region according to the drag. In so doing, the mirroring region control program 131 may identify a drag direction to the overlapping region and display the neighboring screen including the overlapping region with the subscreen in the mirroring region.

The screen split program 133 may include at least one software component for determining the multiple subscreens of the screen. For example, the screen split program 133 may determine whether a particular input pattern is detected in the screen. The particular input pattern may determine the multiple subscreens to be displayed in the screen.

Figure 4A:
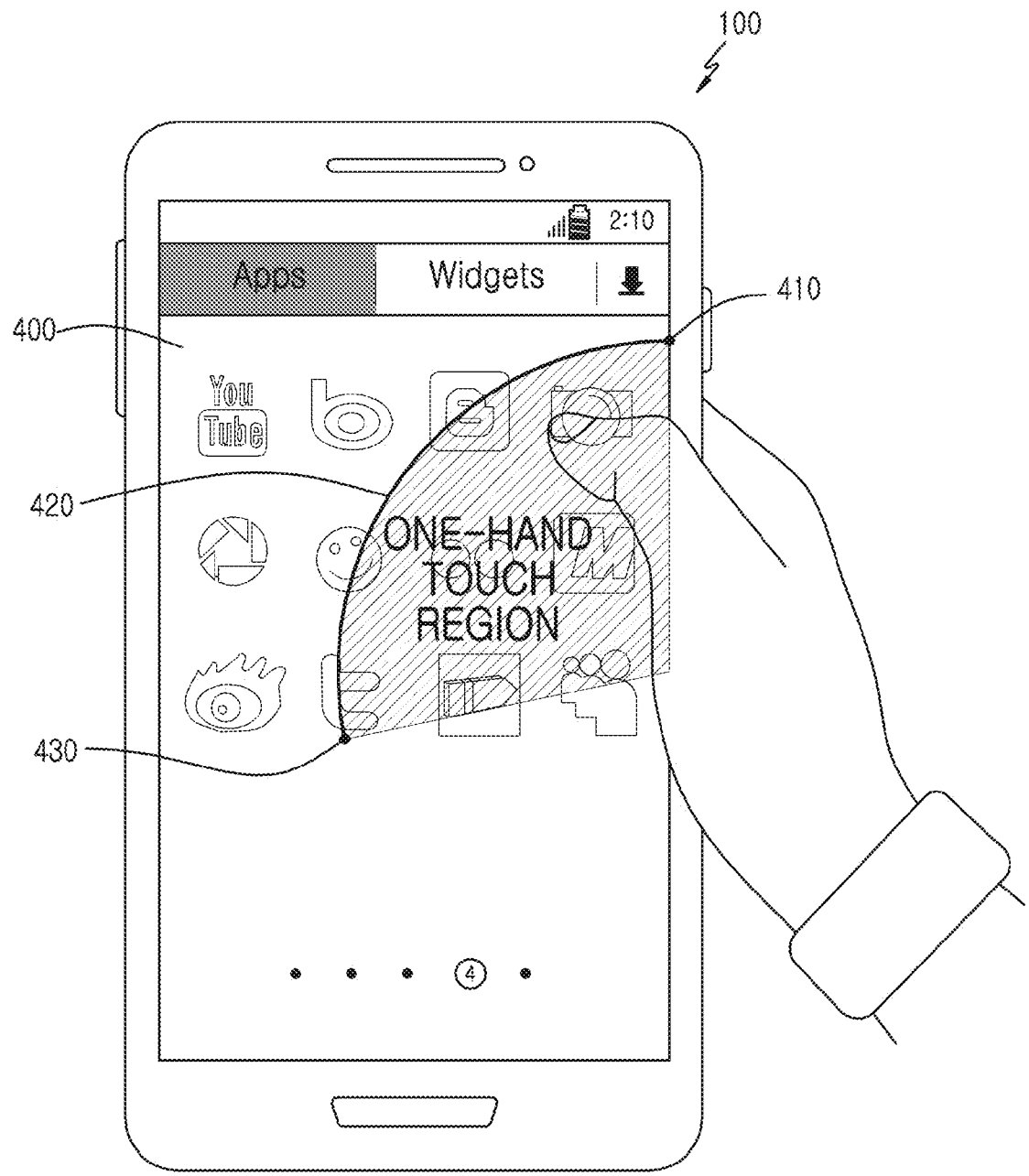
FIGS. 4A and 4B are screens for determining an area of subscreens in an electronic device according to an embodiment of the present disclosure.
Figure 4B:
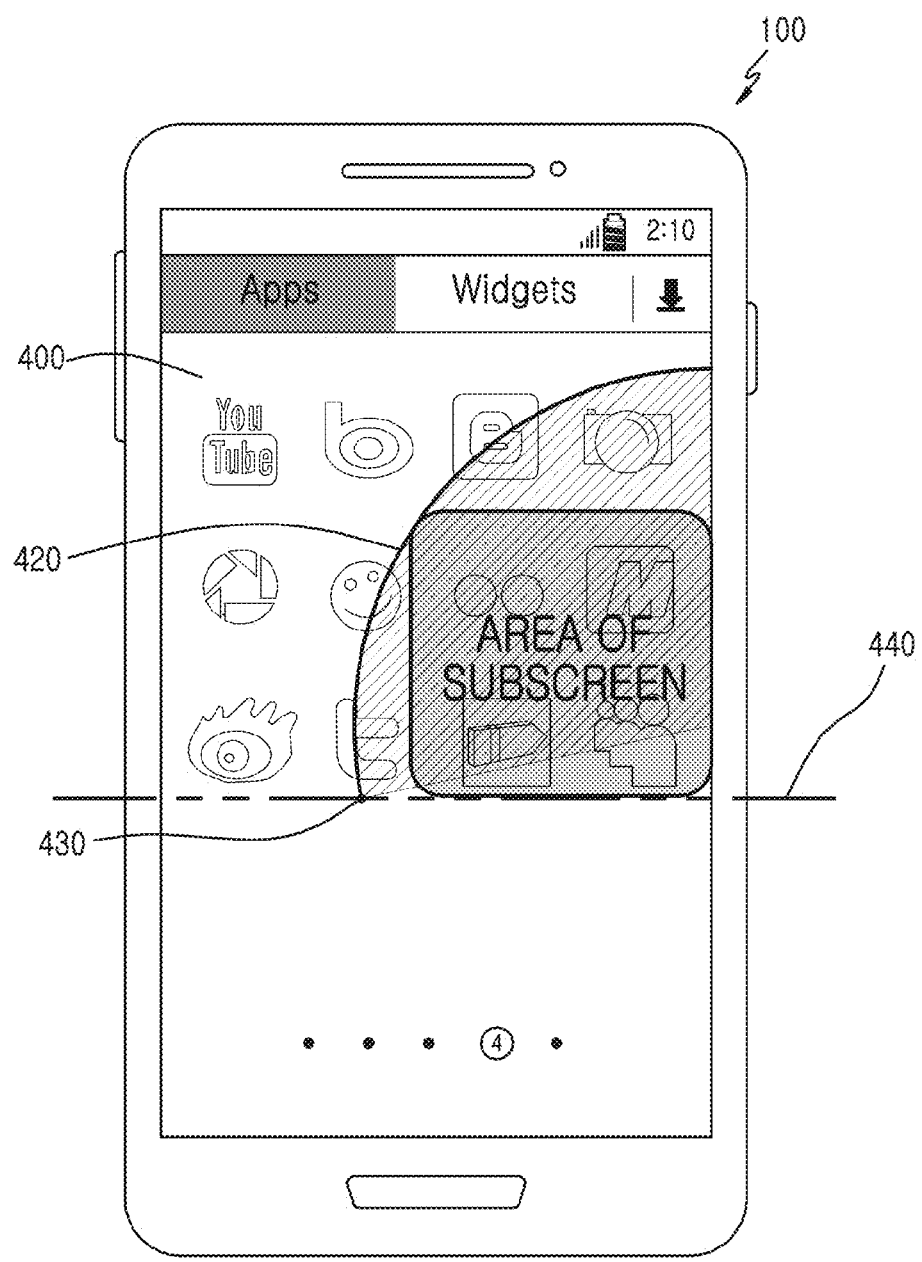

FIGS. 4A and 4B are screens for determining an area of subscreens in an electronic device according to an embodiment of the present disclosure.

Referring FIGS. 4A and 4B, the screen split program 133 may determine an area of the subscreens to display in a screen 400 according to a user's particular input pattern. The particular input pattern may touch a corner point 410 of the screen 400 during a certain time and then draw a parabola 420 from the corner point 410 to a left lower point (also as a drag end point) 430. Based on such a gesture, the screen split program 133 may predict a one-hand touch region and calculate the area of the subscreens to display in the screen 400.

For example, the screen split program 133 may detect a closed curve region defined by the input parabola 420 and a horizontal line 440 of the drag end point 430. The screen split program 133 may determine the greatest square of the closed curve region as the area of the subscreens to display in the screen 400.

For example, the screen split program 133 may determine the multiple subscreens to display in the screen based on a preset criterion. The screen split program 133 may arrange the subscreens of a certain area at regular intervals according to the number of icons or contents displayed in the screen. In so doing, the screen split program 133 may arrange the neighboring subscreens of the multiple subscreens to include the overlapping region of the certain area.

The display control program 135 may include at least one software component for displaying screen information in the touch screen 150. For example, the display control program 135 may graphically display the multiple subscreens and the mirroring region in the touch screen 150. The display control program 135 may include instructions for displaying one of the subscreens in the mirroring region.

The memory 130 may include an internal memory and an external memory. The internal memory may include at least one of the volatile memory (e.g., Dynamic Random Access Memory (DRAM), Static RAM (SRAM), and Synchronous DRAM (SDRAM)) and the non-volatile memory (e.g., One-Time Programmable Read Only Memory (OTPROM), PROM, Erasable PROM (EPROM), Electrically EPROM (EEPROM), mask ROM, flash ROM, NAND flash memory, and NOR flash memory). The internal memory may employ a Solid State Drive (SSD). The external memory may include at least one of a Compact Flash (CF), a Secure Digital (SD), a Micro-SD, a Mini-SD, an extreme digital (xD), and a memory stick.

The memory 130 may further include a kernel, middleware, and an Application Programming Interface (API).

The kernel maycontrol or manage system resources (e.g., the bus 110, the processor 120, and/or the memory 130) used to execute the operation or the function of the other programming modules (e.g., the middleware, the API, and the application). The kernel mayprovide an interface allowing the middleware, the API, and/or the application to access and control or manage the individual component of the electronic device 100.

The middleware may relay data in the communication between the API or the application and the kernel. The middleware may perform load balancing for a work request received from the at least one application by giving priority of the system resource (e.g., the bus 110, the processor 120, and/or the memory 130) of the electronic device 100.

The API, which is an interface for the application to control the kernel or the middleware, may include at least one interface or function for file control, window control, image processing, or text control.

The input part 140 may send the instruction and/or the data generated by the user selection, to the processor 120 or the memory 130 via the bus 110. For example, the input part 140 may include a touch panel, a pen sensor, a key, and an ultrasonic input device.

The touch panel may recognize the touch input using at least one of capacitive, resistive, infrared, and Surface Acoustic Wave (SAW) techniques. The touch panel may further include a controller. The capacitive touch panel may recognize not only the direct touch but also the proximity touch. The proximity touch may be referred to as non-contact touch or hovering. The touch panel may further include a tactile layer to provide a tactile response to the user.

The touch screen 150 may display image, video, and/or data to the user. The touch screen 150 includes a touch panel for conducting the input function and the display function at the same time. The touch panel may employ a Liquid Crystal Display (LCD) or an Active Matrix Organic Light Emitting Diode (AMOLED), and may be implemented flexibly, transparently, or wearably.

The touch screen 150 may include a hologram. The hologram may present a three-dimensional image in the air using interference of light. The touch screen 150 may further include a control circuit for controlling the touch panel or the hologram.

The communication part 160 may connect the communication between the electronic device 100 and one or more other electronic devices (e.g., the electronic device 102 or 104 or the server 164). The communication part 160 may support short-range communication protocol (e.g., Wireless Fidelity (Wi-Fi), Bluetooth (BT), Near Field Communication (NFC)), or network communication (e.g., Internet, Local Area Network (LAN), Wide Area Network (WAN), telecommunication network, cellular network, satellite network, or Plain Old Telephone Service (POTS)). For example, the 100 may communicate across the network 162 with the electronic device 104 or server 164.

The electronic device 100 may further include a sensor module. The sensor module may include at least one of a gesture sensor, a gyro sensor, an atmospheric pressure sensor, a magnetic sensor, an acceleration sensor, a grip sensor, a proximity sensor, a Red Green Blue (RGB) sensor, a biometric sensor, a temperature/humidity sensor, a light sensor, and an UltraViolet (UV) sensor. The sensor module may measure a physical quantity or detect the operation status of the electronic device 100, and convert the measured or detected information to an electric signal. The sensor module may include an E-noise sensor, an electromyography (EMG) sensor, an electroencephalogram (EEG) sensor, an electrocardiogram (ECG) sensor, or a finger print sensor.

The names of the hardware components of the present disclosure may vary according to a type of the electronic device 100. Depending on the type of the electronic device 100, the electronic device 100 may include at least one of the components, omit some components, or further include other components.

Figure 2:
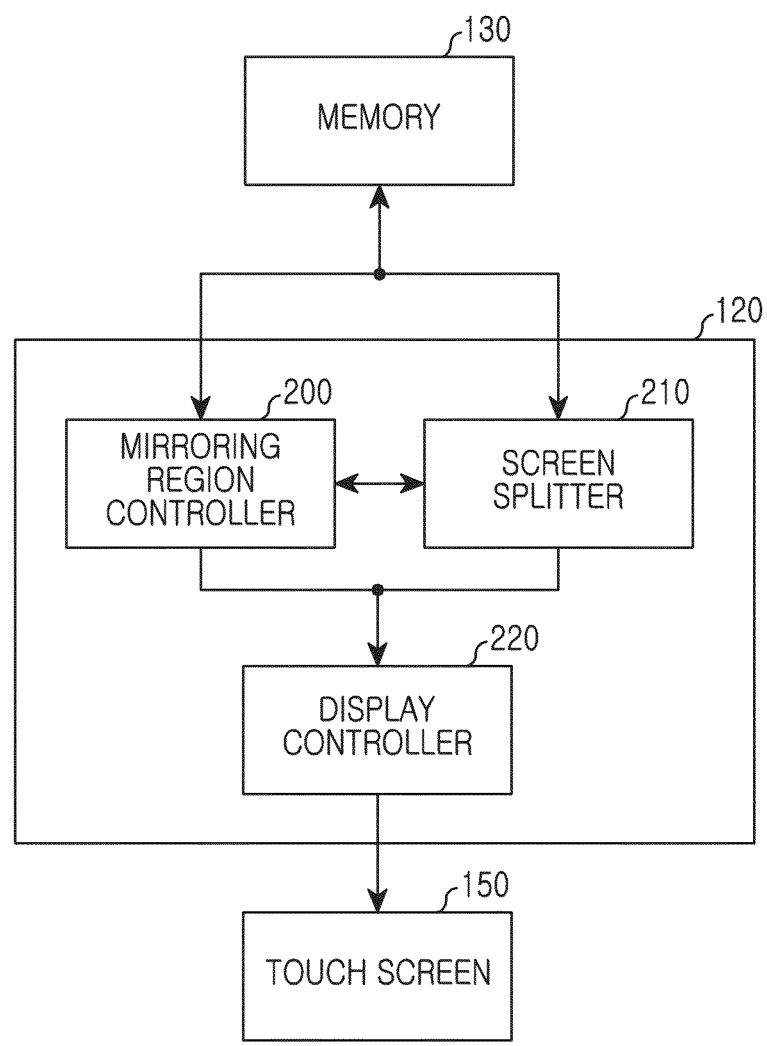
FIG. 2 is a detailed block diagram of a processor according to an embodiment of the present disclosure.

FIG. 2 is a detailed block diagram of the processor according to an embodiment of the present disclosure.

Referring to FIG. 2, the processor 120 includes a mirroring region controller 200, a screen splitter 210, and a display controller 220, but is not limited thereto.

The mirroring region controller 200 may execute the mirroring region control program 131 stored in the memory 130 and determine one of the subscreens to display in the mirroring region.

For example, the mirroring region controller 200 may display the icon corresponding to the other subscreen not displayed in the mirroring region, around the mirroring region. When the displayed icon is selected, the mirroring region controller 200 may control to display the subscreen corresponding to the selected icon in the mirroring region.

For example, the mirroring region controller 200 may detect the touch during the reference time around the mirroring region. The mirroring region controller 200 may display an object corresponding to the multiple subscreens at the detected touch point. When the displayed object is selected, the mirroring region controller 200 may control to display the subscreen corresponding to the selected object in the mirroring region.

For example, the mirroring region controller 200 may detect the vertical drag in a certain region of the mirroring region. The mirroring region controller 200 may control to display the corresponding subscreen in the mirroring region according to the movement distance of the detected drag.

For example, the mirroring region controller 200 may determine whether the user's drag moves from the one subscreen displayed in the mirroring region to the overlapping region. The electronic device user may drag the screen displayed in the mirroring region to a certain distance. When receiving the user drag from the one subscreen displayed in the mirroring region to the neighboring screen including the overlapping region with the subscreen, the mirroring region controller 200 may display the neighboring screen including the overlapping region with the one subscreen, in the mirroring region according to the drag. In so doing, the mirroring region controller 200 may identify the drag direction to the overlapping region and display the neighboring screen including the overlapping region with the subscreen, in the mirroring region.

The screen splitter 210 may execute the screen split program 133 stored in the memory 130 and determine the multiple split subscreens of the screen. The screen splitter 210 may provide the display controller 220 with the determined subscreen information. For example, the screen splitter 210 may determine whether the particular input pattern is detected in the screen. The particular input pattern may determine the multiple subscreen regions to display in the screen.

For example, the screen splitter 210 may determine the area of the subscreens to display in the screen 400 according to the user's particular input pattern as shown in FIGS. 4A and 4B. The particular input pattern may touch the corner point 410 of the screen 400 during the certain time and then draw the parabola 420 from the corner point 410 to the left lower point 430. Based on such a gesture, the screen splitter 210 may predict the one-hand touch region and calculate the area of the subscreens to display in the screen 400.

For example, the screen splitter 210 may detect the closed curve region defined by the input parabola 420 and the horizontal line 440 of the drag end point 430. The screen splitter 210 may determine the greatest square of the closed curve area as the area of the subscreens to display in the screen 400.

For example, the screen splitter 210 may determine the multiple subscreens to display in the screen based on the preset criterion. The screen splitter 210 may arrange the subscreens of the certain area at regular intervals according to the number of icons or contents displayed in the screen. In so doing, the screen splitter 210 may arrange the neighboring subscreens of the multiple subscreens to include the overlapping region of the certain area.

The display controller 220 may execute the display control program 135 stored in the memory 130 and graphically display the screen information fed from the mirroring region controller 200 and the screen splitter 210, through the touch screen 150.

While the components of the processor 120 may be the separate modules, a single module may include them as software components.

Figure 3:
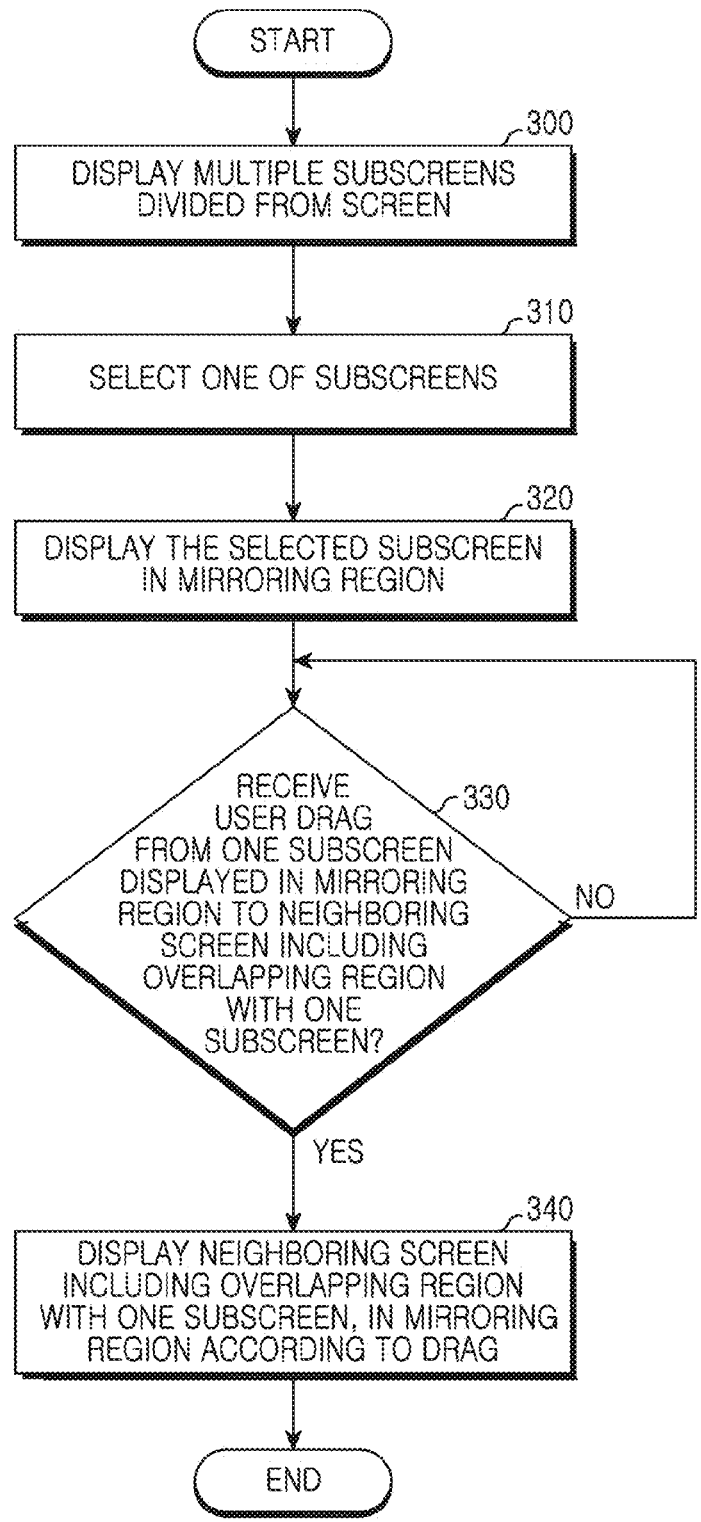
FIG. 3 is a flowchart of a method for controlling a screen in an electronic device according to an embodiment of the present disclosure.

FIG. 3 is a flowchart of a method for controlling a screen in an electronic device according to an embodiment of the present disclosure.

Referring to FIG. 3, the electronic device 100 displays the multiple split subscreens in operation 300. In so doing, the electronic device 100 may determine whether the particular input pattern is detected in the screen. The particular input pattern may determine the multiple subscreens to be displayed in the screen.

For example, the electronic device 100 may determine the area of the subscreens to display in the screen 400 according to the user's particular input pattern as shown in FIGS. 4A and 4B. The particular input pattern may touch the corner point 410 of the screen 400 during the certain time and then draw the parabola 420 from the corner point 410 to the left lower point 430. Based on such a gesture, the electronic device 100 may predict the one-hand touch region and calculate the area of the subscreens to display in the screen 400.

For example, the electronic device 100 may detect the closed curve region defined by the input parabola 420 and the horizontal line 440 of the drag end point 430. The electronic device 100 may determine the greatest square of the closed curve area as the area of the subscreens to display in the screen 400.

For example, the electronic device 100 may determine the multiple subscreens to display in the screen based on the preset criterion. The electronic device 100 may arrange the subscreens of the certain area at regular intervals according to the number of icons or contents displayed in the screen. In so doing, the electronic device 100 may arrange the neighboring subscreens of the multiple subscreens to include the overlapping region of the certain area.

FIGS. 5A, 5B, 5C, 5D, and 5E are screens for controlling a screen in an electronic device according to an embodiment of the present disclosure.

Figure 5A:
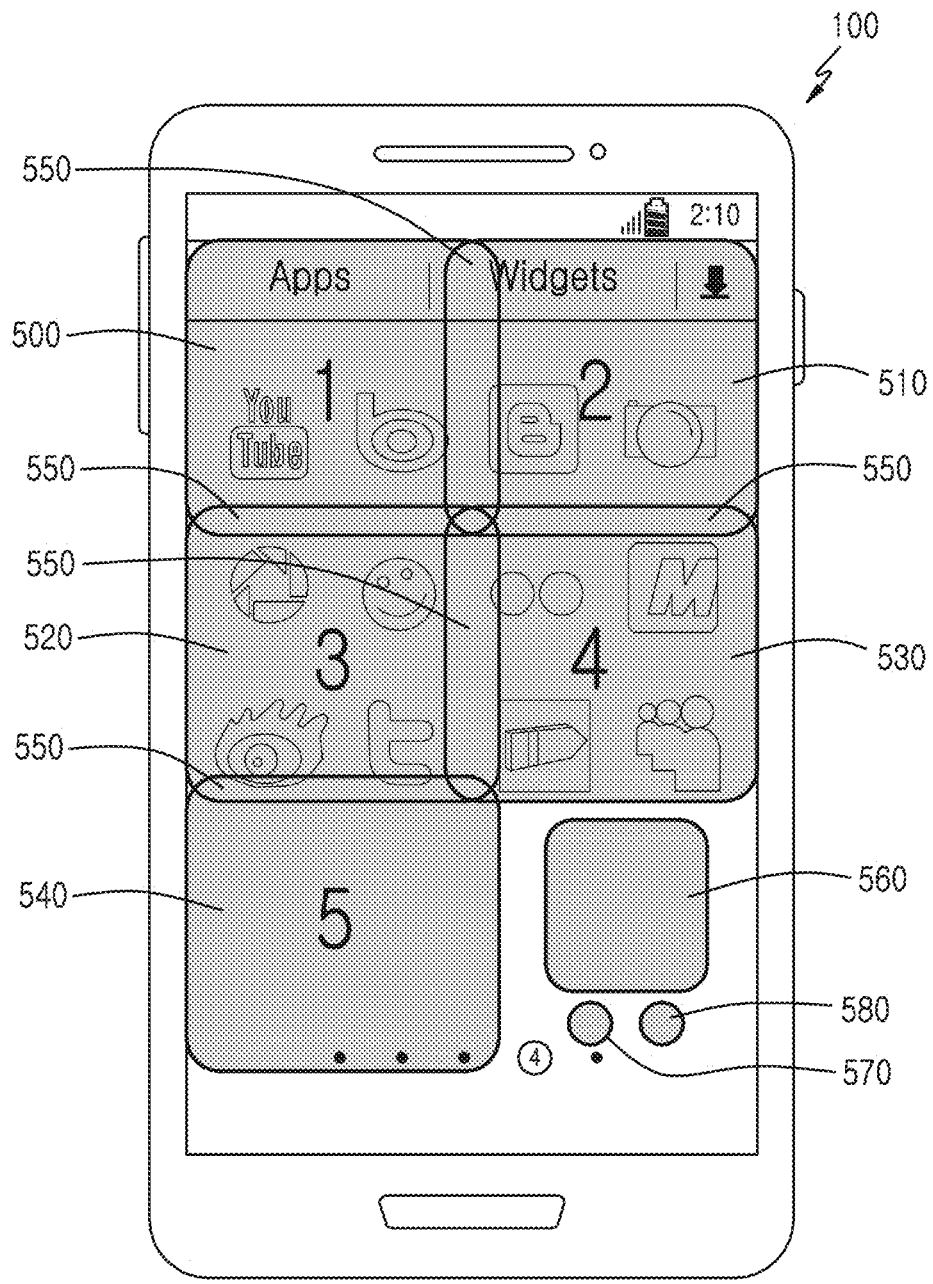
FIGS. 5A, 5B, 5C, 5D, and 5E are screens for controlling a screen in an electronic device according to an embodiment of the present disclosure.

Referring to FIG. 5A, the electronic device 100 may display the multiple split subscreens 500, 510, 520, 530 and 540 of the screen as shown in FIG. 5A. The subscreens 500, 510, 520, 530 and 540 may display a text indicating their screen label. The subscreens 500, 510, 520, 530 and 540 may include an overlapping region 550 of a certain area in relation to the neighboring subscreen. A plurality of the overlapping regions 550 may exist, and the overlapping regions 550 may be identical or different in area or in shape.

For example, the electronic device 100 may further display a mirroring region 560 in part of the screen. The mirroring region 560 may serve as a screen selection input part for selecting one of the subscreens 500, 510, 520, 530 and 540, to be explained. In so doing, the mirroring region 560 may display the selected subscreen. For example, the mirroring region 560 may be displayed at a preset location or at various locations according to the grip type of the electronic device 100. The mirroring region 560 may have, but not limited to, the same size as the subscreen.

For example, the electronic device 100 may display one or more function buttons 570 and 580 around the mirroring region 560. The function buttons 570 and 580 may include, but not limited to, an option button 570 for the smooth operation of the mirroring region 560, and a cancel button 580 for canceling the recent operation.

Figure 5B:
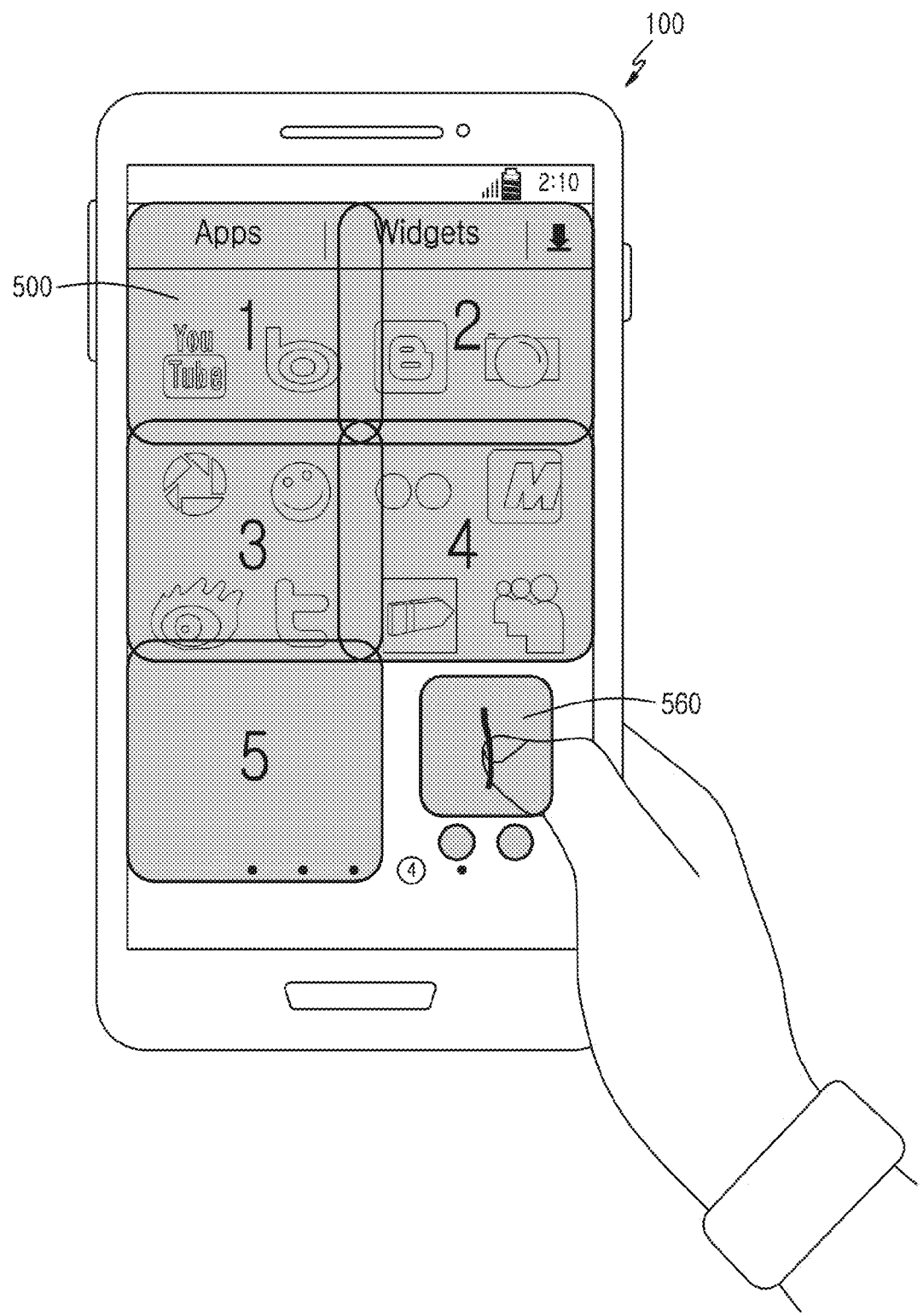

Referring to FIG. 5B, in operation 310, the electronic device 100 selects one of the displayed subscreens. For example, the electronic device 100 may select the subscreen 500 by inputting the label of the subscreen 500 to display in the mirroring region 560. For example, the electronic device 100 may select the subscreen 500 by touching the label of the subscreen 500 displayed in the mirroring region 560. The selection is not limited to those examples, and the subscreen 500 to display in the mirroring region 560 may be selected in various manners.

Figure 5C:
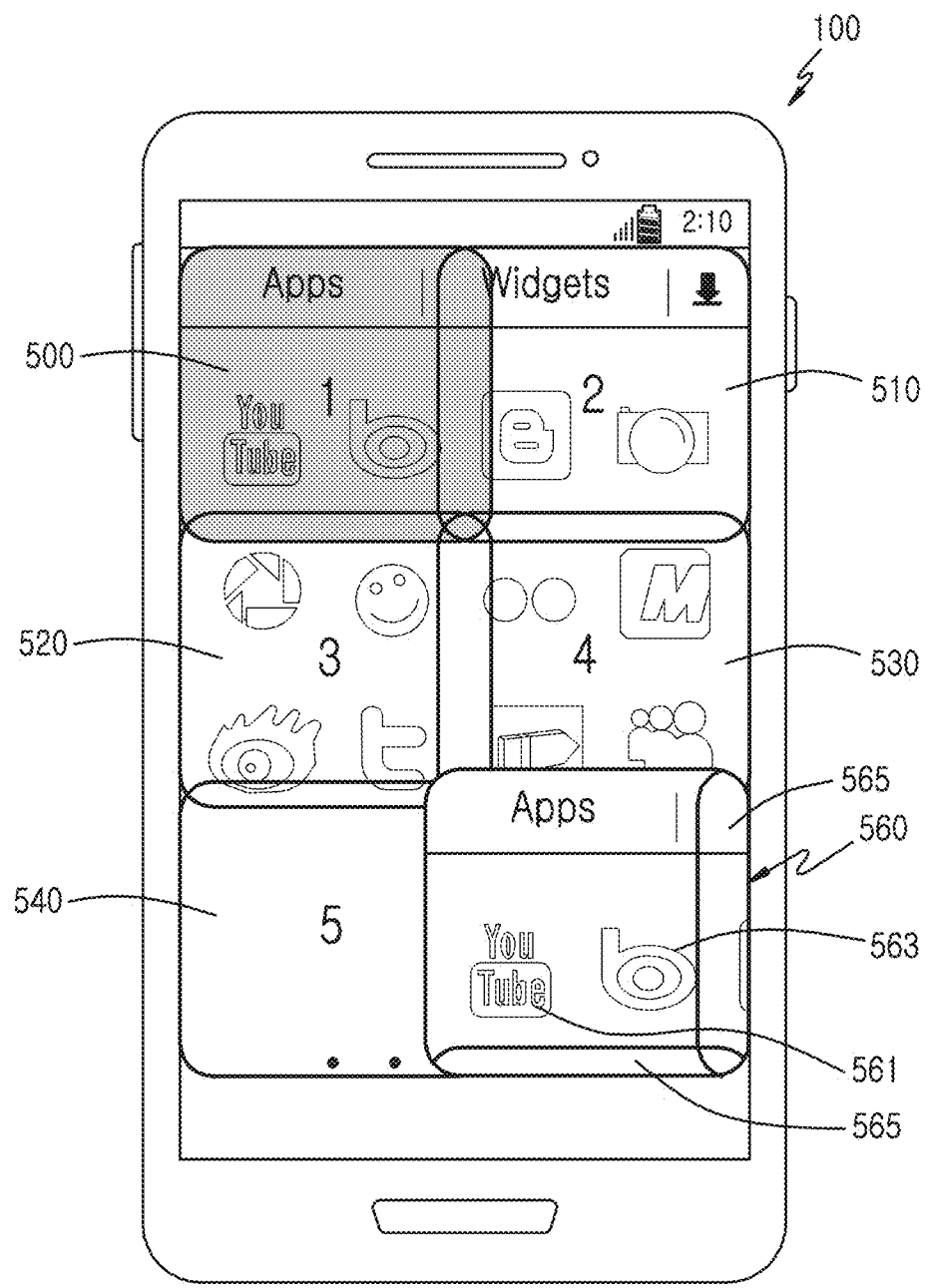

Referring to FIG. 5C, in operation 320, the electronic device 100 displays the selected subscreen in the mirroring region. In so doing, the electronic device 100 may transparently display the other subscreens 510, 520, 530 and 540 so that the user may identify the subscreen to be displayed in the mirroring region 560. The electronic device 100 may highlight the corresponding subscreen 500 displayed in the mirroring region 560.

For example, the electronic device 100 may allow various gestures such as touch, drag, swipe, and hovering in the mirroring region 560. The electronic device 100 may process various functions, for example, execute or edit icons 561 and 563 displayed in the mirroring region 560. The electronic device 100 may move the corresponding subscreen 500 displayed in the current mirroring region 560 using the overlapping region 565 displayed in the mirroring region 560, to be explained.

Figure 5D:
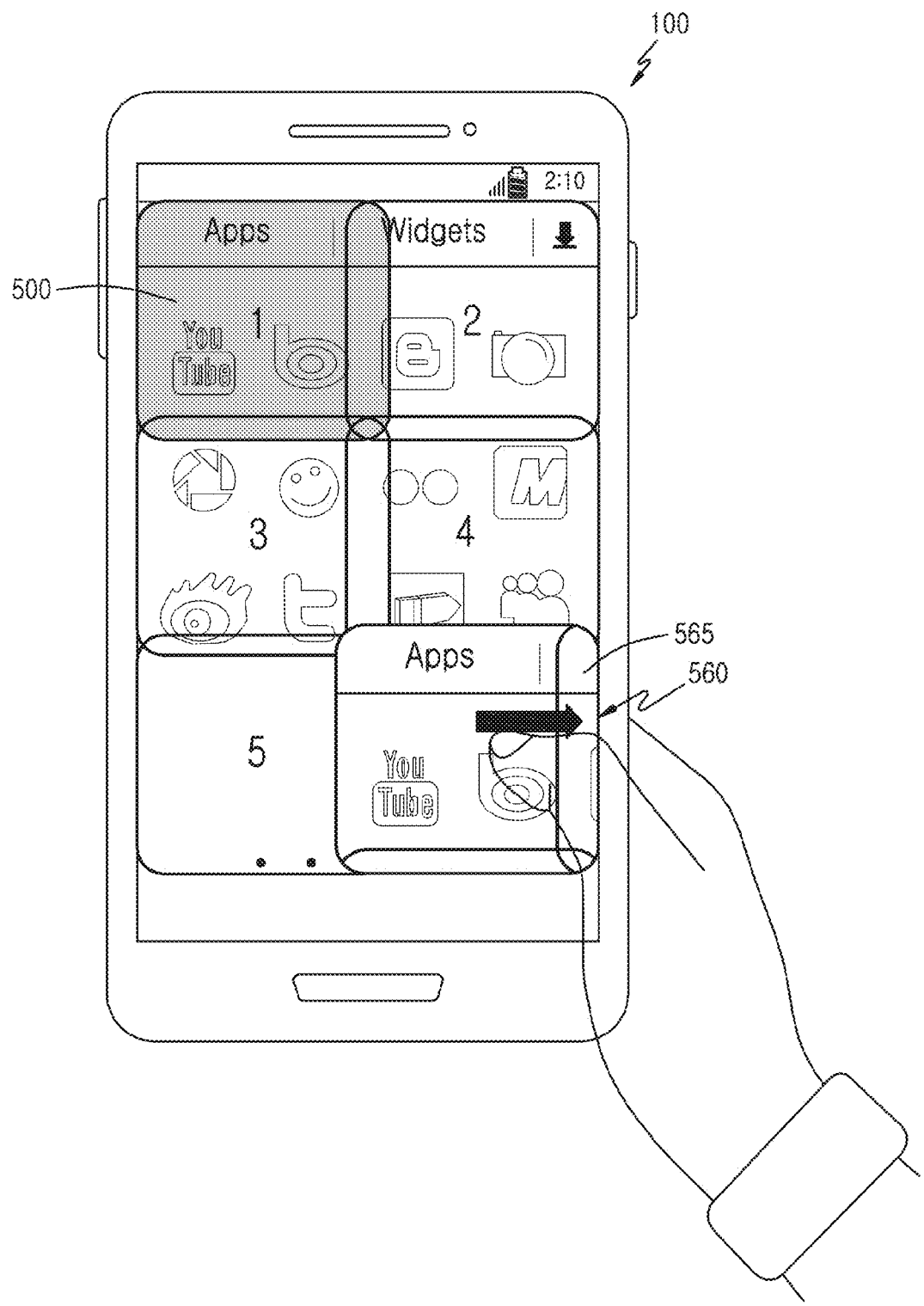
Figure 5E:
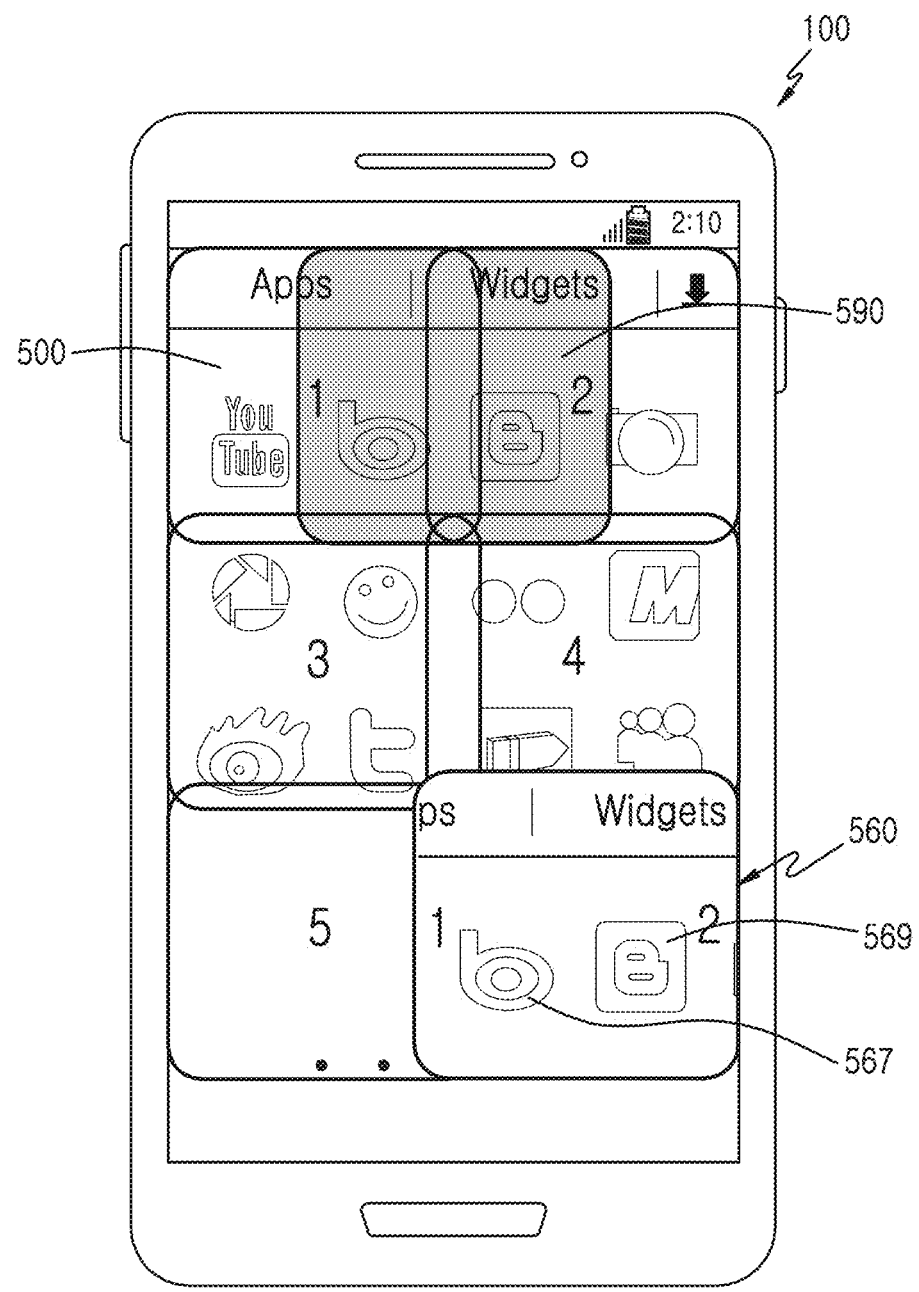

Referring to FIG. 5D, in operation 330, the electronic device 100 determines whether the user drag from the one subscreen displayed in the mirroring region to the neighboring screen, including the overlapping region with the one subscreen, is received. For example, the electronic device user may drag the screen displayed in the mirroring region 560 to a certain distance.

When receiving the user drag from the one subscreen displayed in the mirroring region to the neighboring screen including the overlapping region with the one subscreen, the electronic device 100 displays the neighboring screen including the overlapping region with the one subscreen, in the mirroring region according to the drag in operation 340. In so doing, the electronic device 100 may identify the drag direction to the overlapping region and display the neighboring screen including the overlapping region with the subscreen displayed in the mirroring region.

Referring to 5E, when the electronic device user drags rightward from the mirroring region 560 to the overlapping region 565 as shown in FIG. 5D, the electronic device 100 may display a neighboring screen 590 which is on the right of the selected subscreen 500. For example, the electronic device 100 may display the neighboring region in proportion to a drag length moved in the overlapping region 560. For example, when the drag moves into the overlapping region 560, the electronic device 100 may display a preset neighboring screen according to the drag direction. For example, when the drag moves into the overlapping region 560, the electronic device 100 may display other neighboring screen according to the drag direction. The displayed subscreen is not limited those neighboring screens, and the neighboring screen may be displayed in the mirroring region based on the drag in various fashions. The electronic device 100 may allow various gestures such as touch, drag, swipe, and hovering in the mirroring region 560. The electronic device 100 may process various functions, for example, execute or edit the icons 569 and 567 displayed in the mirroring region 560.

The present disclosure has described, but not limited to, the screen for selecting the application. For example, the electronic device 100 may be operable in the screen where every available application is executed.

Figure 6:
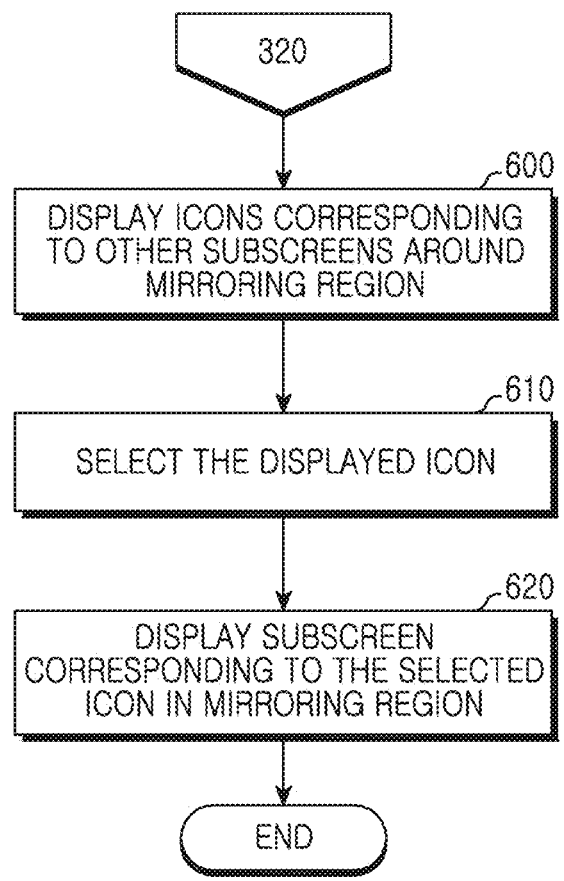
FIG. 6 is a flowchart of a method for controlling a screen in an electronic device according to an embodiment of the present disclosure.

FIG. 6 is a flowchart of a method for controlling a screen in an electronic device according to an embodiment of the present disclosure.

Referring to FIG. 6, the electronic device 100 displays the one selected subscreen in the mirroring region in operation 320 of FIG. 3, and then displays the icons corresponding to the other subscreens around the mirroring region in operation 600. In so doing, the other subscreens may include the other subscreens not displayed in the mirroring region.

Figure 7A:
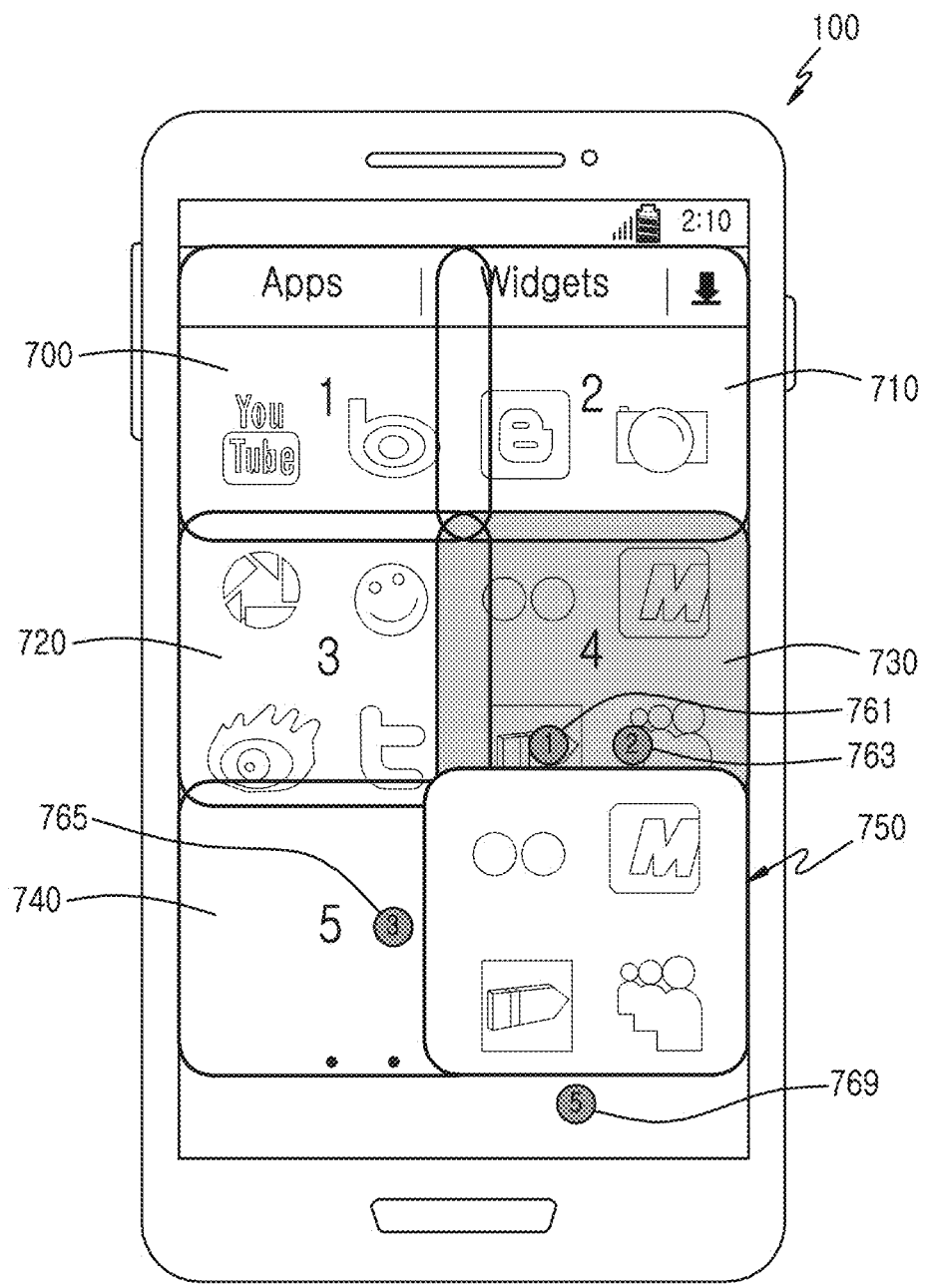
FIGS. 7A, 7B, and 7C are screens for controlling a screen in an electronic device according to an embodiment of the present disclosure.
Figure 7B:
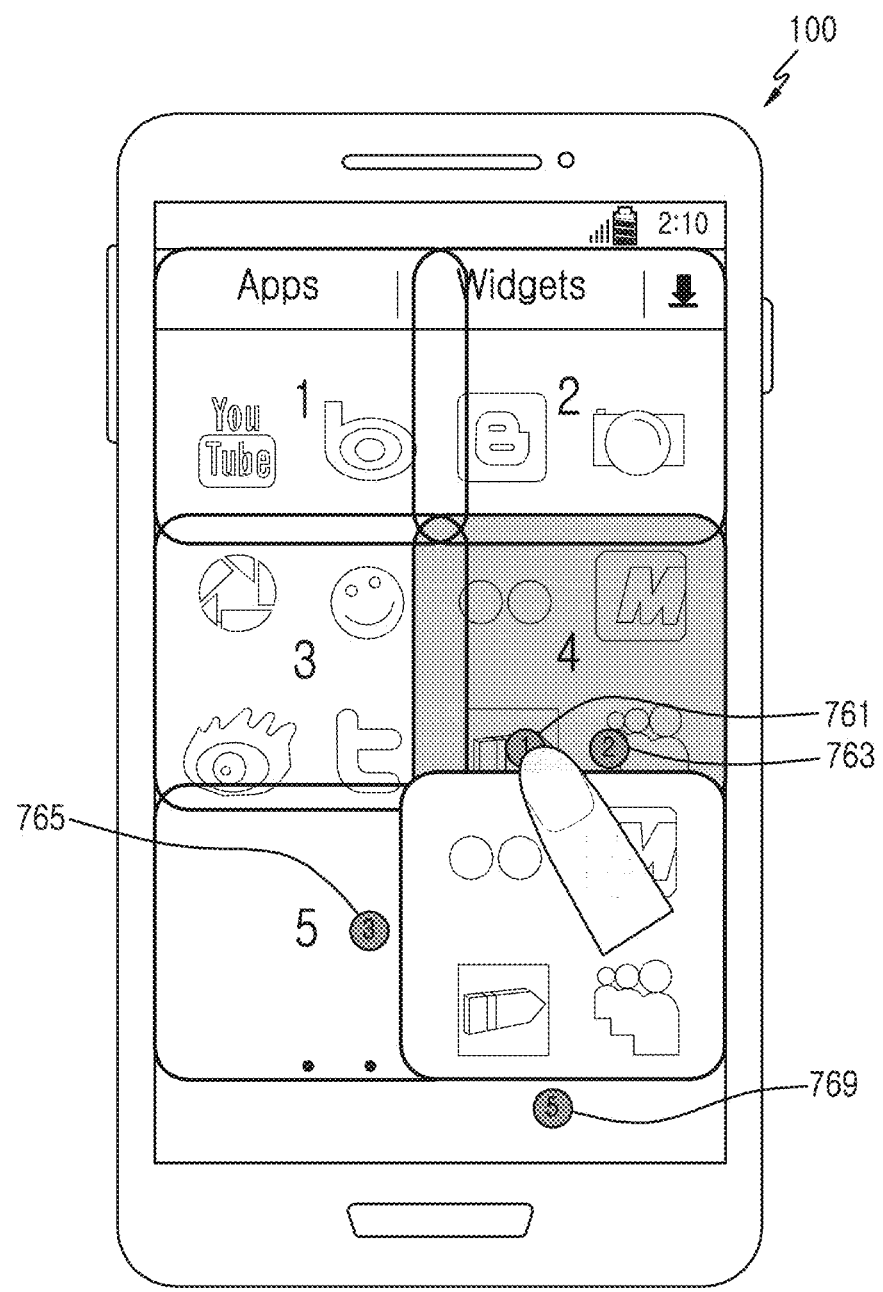
Figure 7C:
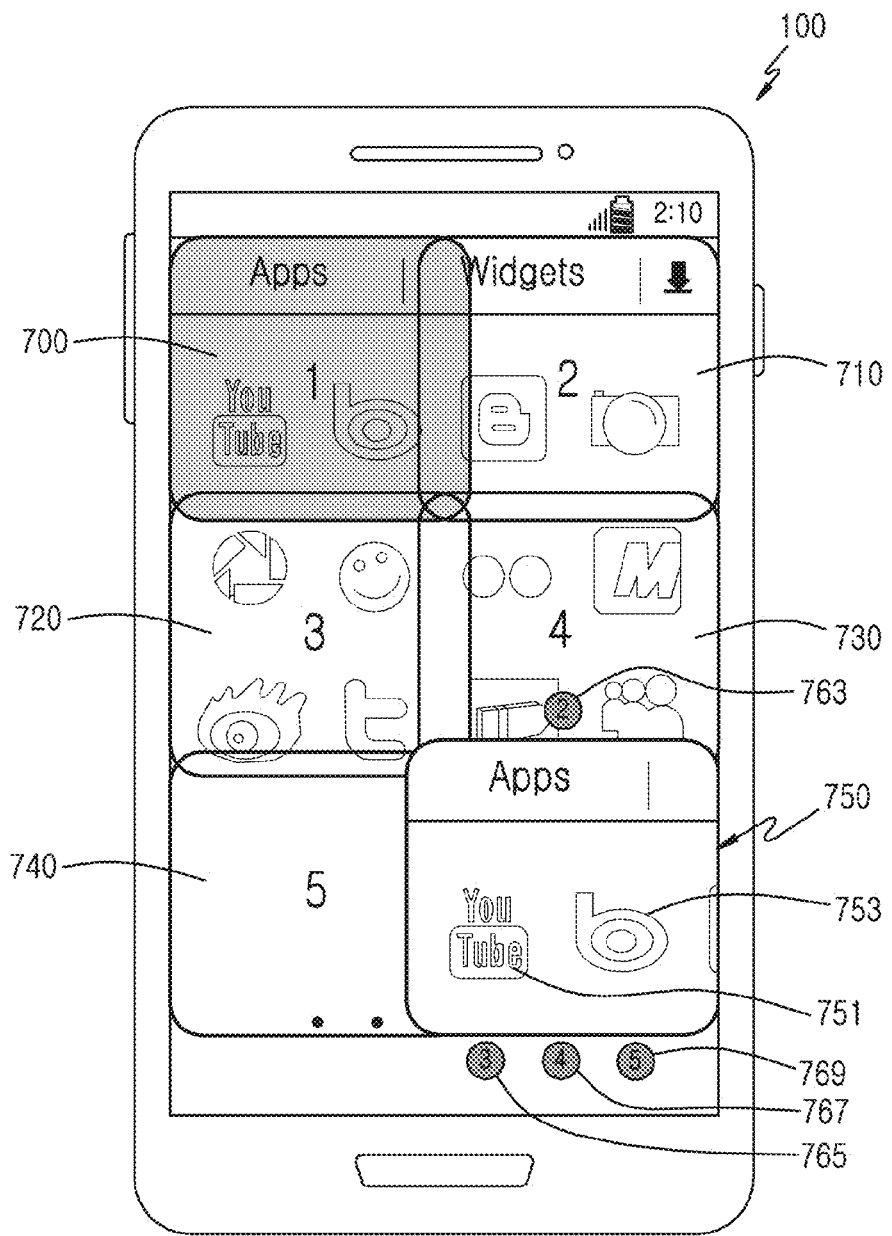

FIGS. 7A, 7B, and 7C are screens for controlling a screen in an electronic device according to an embodiment of the present disclosure.

Referring to FIG. 7A, the electronic device 100 may display icons 761, 763, 765 and 769 corresponding to the other subscreens 700, 710, 720, 730 and 740, around a mirroring region 750. Herein, the mirroring region 750 is displaying the selected subscreen 730. The icons 761, 763, 765 and 769 may include respective screen label information of the other subscreens 700, 710, 720, 730 and 740.

For example, the electronic device 100 may arrange the icons 761, 763, 765 and 769 in an up, down, left, or right side of the mirroring region 750 based on the current subscreen 730 displayed in the mirroring region 750. For example, since the first subscreen 700 and the second subscreen 710 are above the selected subscreen 730, the first icon 761 and the second icon 763 corresponding to the first subscreen 700 and the second subscreen 710 may be placed above the mirroring region 750. Similarly, the third icon 765 corresponding to the third subscreen 720 is placed on the left side of the mirroring region 750, and the fifth icon 769 corresponding to the fifth subscreen 740 is placed below the mirroring region 750.

For example, the electronic device 100 may arrange the icons 761, 763, 765 and 769 at preset locations. Such locations may be defined by the user or at random.

Referring to FIG. 7B, in operation 610, the electronic device 100 selects the displayed icon. For example, the electronic device 100 may touch and select one 761 of the displayed icons 761, 763, 765 and 769. In so doing, the subscreen corresponding to the selected icon 761 may be marked.

Referring to FIG. 7C, in operation 620, the electronic device 100 displays the subscreen corresponding to the selected icon in the mirroring region. For example, the electronic device 100 may display the first subscreen 700 corresponding to the selected icon 761 of FIG. 7B in the mirroring region. In so doing, the icons may be rearranged around the mirroring region 750. For example, the icons 763, 765 and 769 corresponding to the other subscreens 710, 720, 730 and 740 not displayed in the mirroring region 750 may be arranged in the up, down, left, or right side of the first subscreen 700 based on the first subscreen 700 displayed in the mirroring region 750. For example, the electronic device 100 may rearrange the icons 763, 765 and 769 at preset locations. Such locations may be defined by the user or at random. The electronic device 100 may allow various gestures such as touch, drag, swipe, and hovering in the mirroring region 750. The electronic device 100 may process various functions, for example, execute or edit the icons 751 and 753 displayed in the mirroring region 750.

The present disclosure has described, but is not limited to, the screen for selecting the application. For example, the electronic device 100 may be operable in the screen where every available application is executed.

Figure 8:
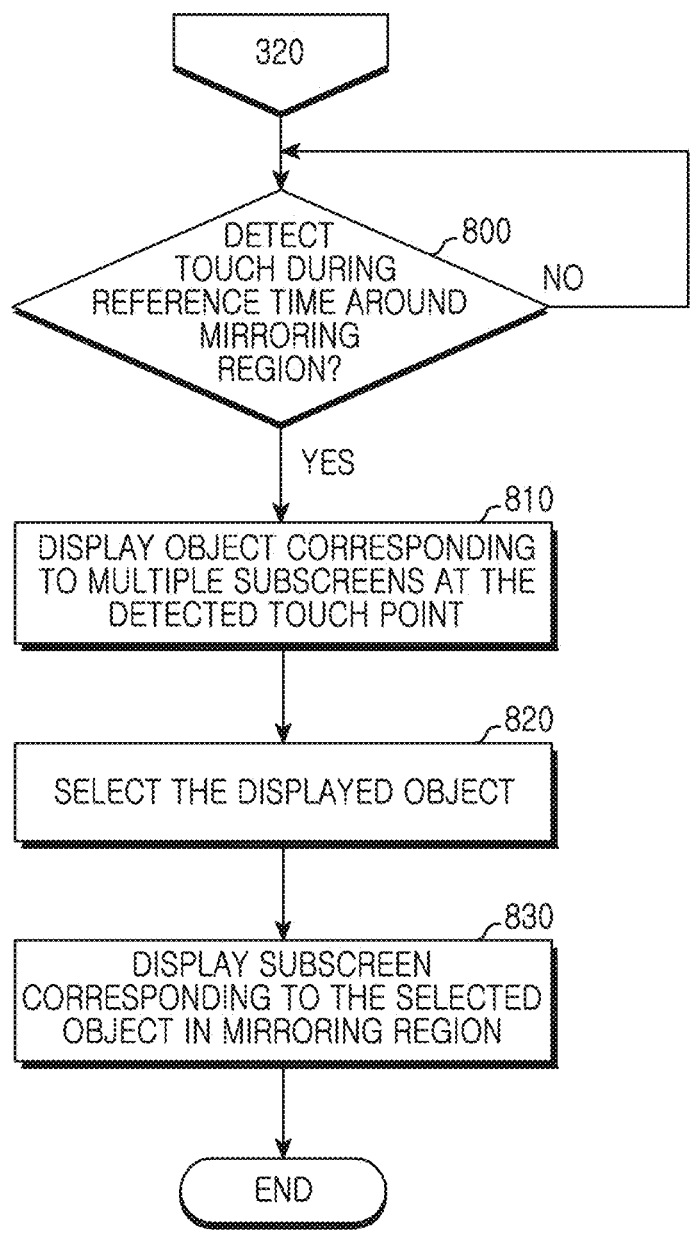
FIG. 8 is a flowchart of a method for controlling a screen in an electronic device according to an embodiment of the present disclosure.

FIG. 8 is a flowchart of a method for controlling a screen in an electronic device according to an embodiment of the present disclosure.

Referring to FIG. 8, the electronic device 100 may display the one selected subscreen in the mirroring region in operation 320 of FIG. 3, and then detect the touch during the reference time around the mirroring region in operation 800. For example, the electronic device 100 may detect, but not limited to, the touch on the corner point of the screen during a certain time. The electronic device 100 may detect the touch on a preset point.

Figure 9A:
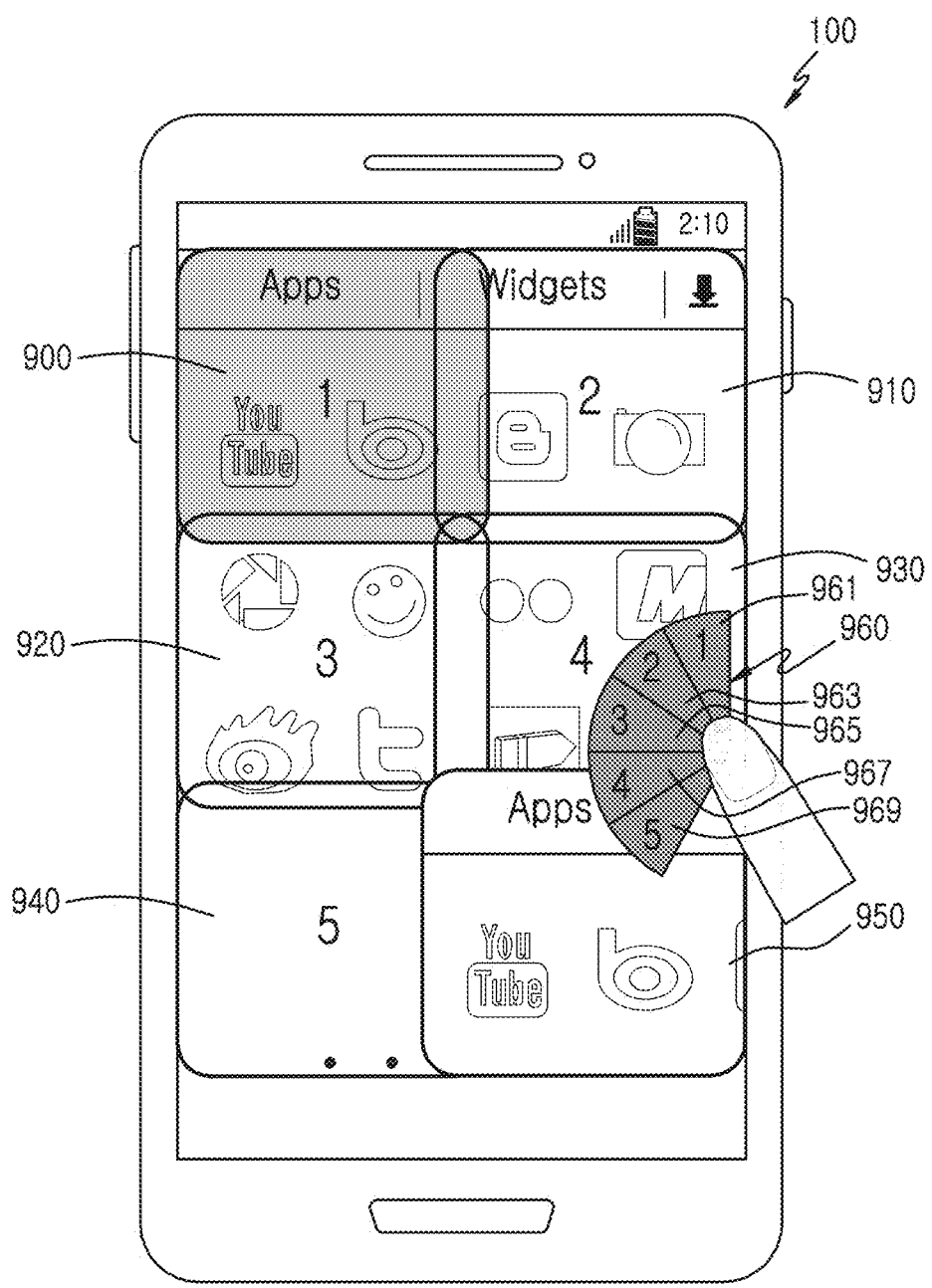
FIGS. 9A and 9B are screens for controlling a screen in an electronic device according to an embodiment of the present disclosure.
Figure 9B:
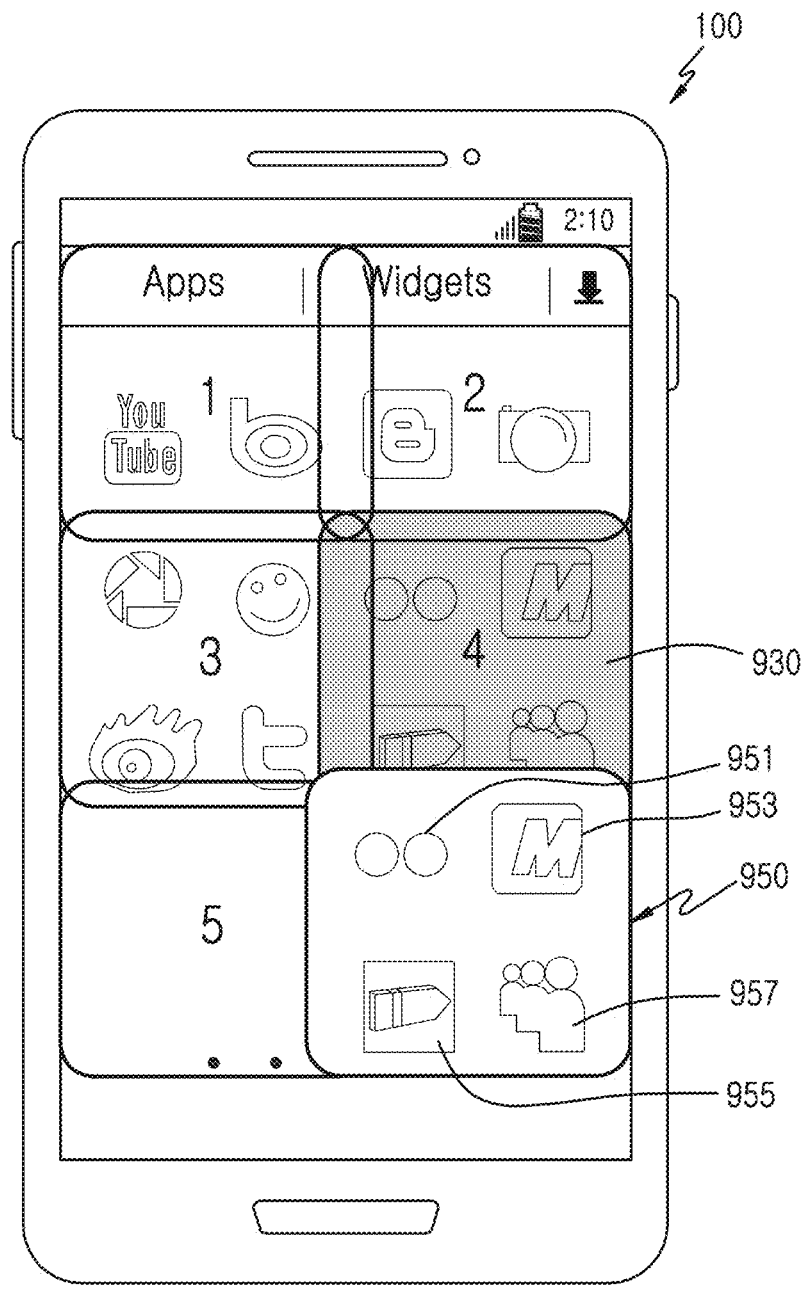

FIGS. 9A and 9B are screens for controlling a screen in an electronic device according to an embodiment of the present disclosure.

Referring to FIG. 9A, in operation 810, the electronic device 100 displays the object corresponding to the multiple subscreens at the detected touch point. For example, the electronic device 100 may display an object 960 corresponding to the multiple subscreens 900, 910, 920, 930 and 940 based on the touch point. Herein, the mirroring region 950 displays the one selected subscreen 900. The object 960 may include screen label information 961, 963, 965, 967 and 969 of the subscreens 900, 910, 920, 930 and 940. The screen label information 961, 963, 965, 967 and 969 may be arranged at regular intervals or in a particular region. The object 960 is in, but not limited to, a fan shape and may have various shapes and sizes.

In operation 820, the electronic device 100 selects the displayed object. For example, the electronic device 100 may touch and select one 967 of the screen label information 961, 963, 965, 967 and 969 of the displayed object 960. In so doing, the subscreen corresponding to the selected screen label information 967 may be marked.

In operation 830, the electronic device 100 displays the subscreen corresponding to the selected object in the mirroring region.

Referring to FIG. 9B, the electronic device 100 may display in the mirroring region 950, the fourth subscreen 930 corresponding to the screen label information 967 of FIG. 9A of the selected object 960 of FIG. 9A. The electronic device 100 may allow various gestures such as touch, drag, swipe, and hovering in the mirroring region 950. The electronic device 100 may process various functions, for example, execute or edit the icons 951, 953, 955 and 957 displayed in the mirroring region 950.

The present disclosure has described, but is not limited to, the screen for selecting the application. For example, the electronic device 100 may be operable in the screen where every available application is executed.

Figure 10:
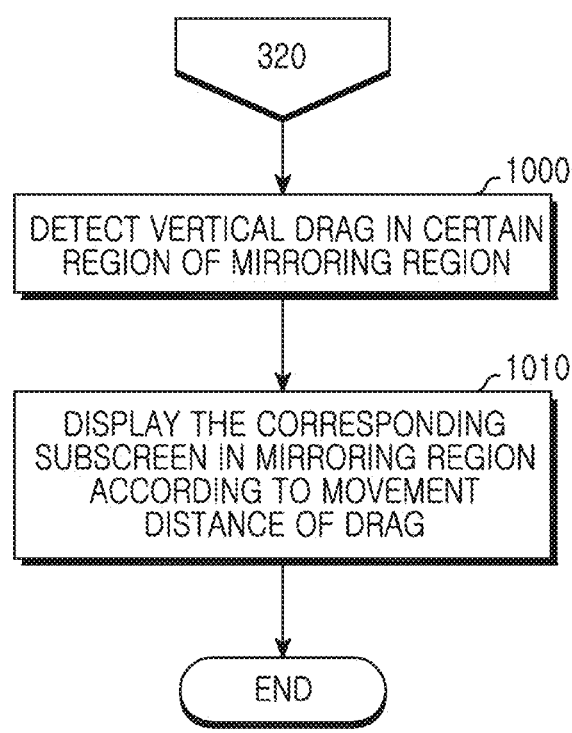
FIG. 10 is a flowchart of a method for controlling a screen in an electronic device according to an embodiment of the present disclosure.

FIG. 10 is a flowchart of a method for controlling a screen in an electronic device according to an embodiment of the present disclosure.

Referring to FIG. 10, the electronic device 100 displays the one selected subscreen in the mirroring region in operation 320 of FIG. 3, and then detects the vertical drag in a certain region of the mirroring region in operation 1000.

Figure 11A:
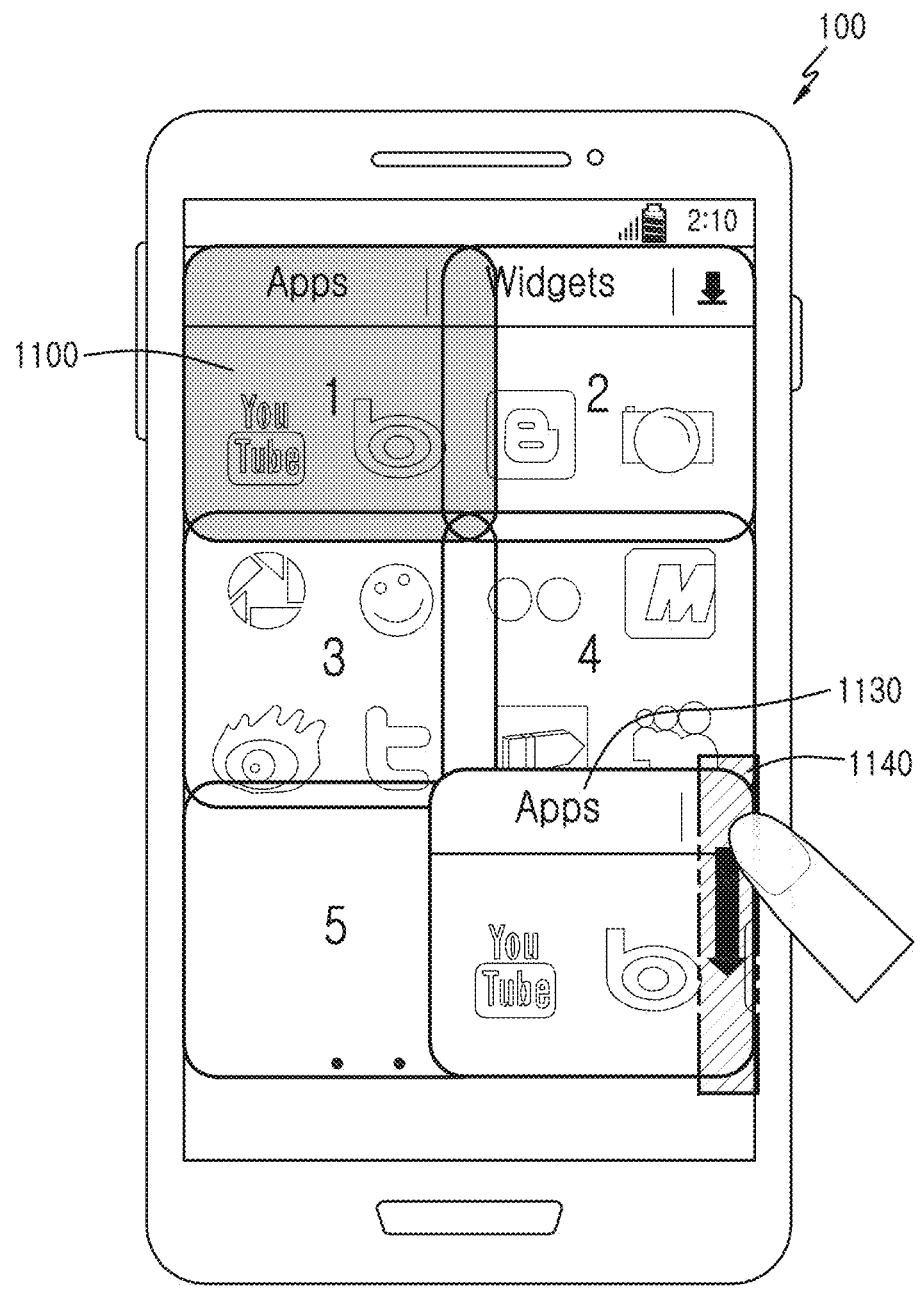
FIGS. 11A, 11B, and 11C are screens for controlling a screen in an electronic device according to an embodiment of the present disclosure.
Figure 11B:
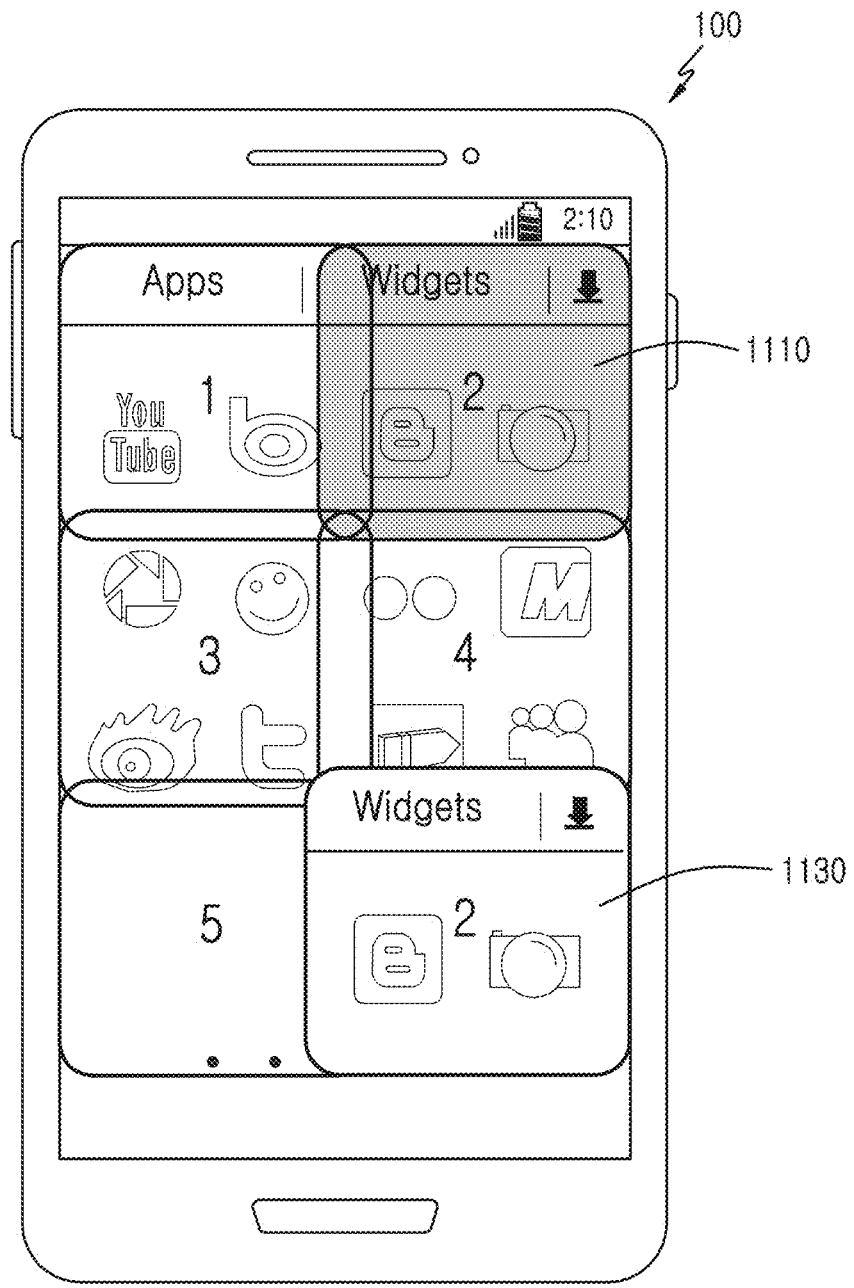
Figure 11C:
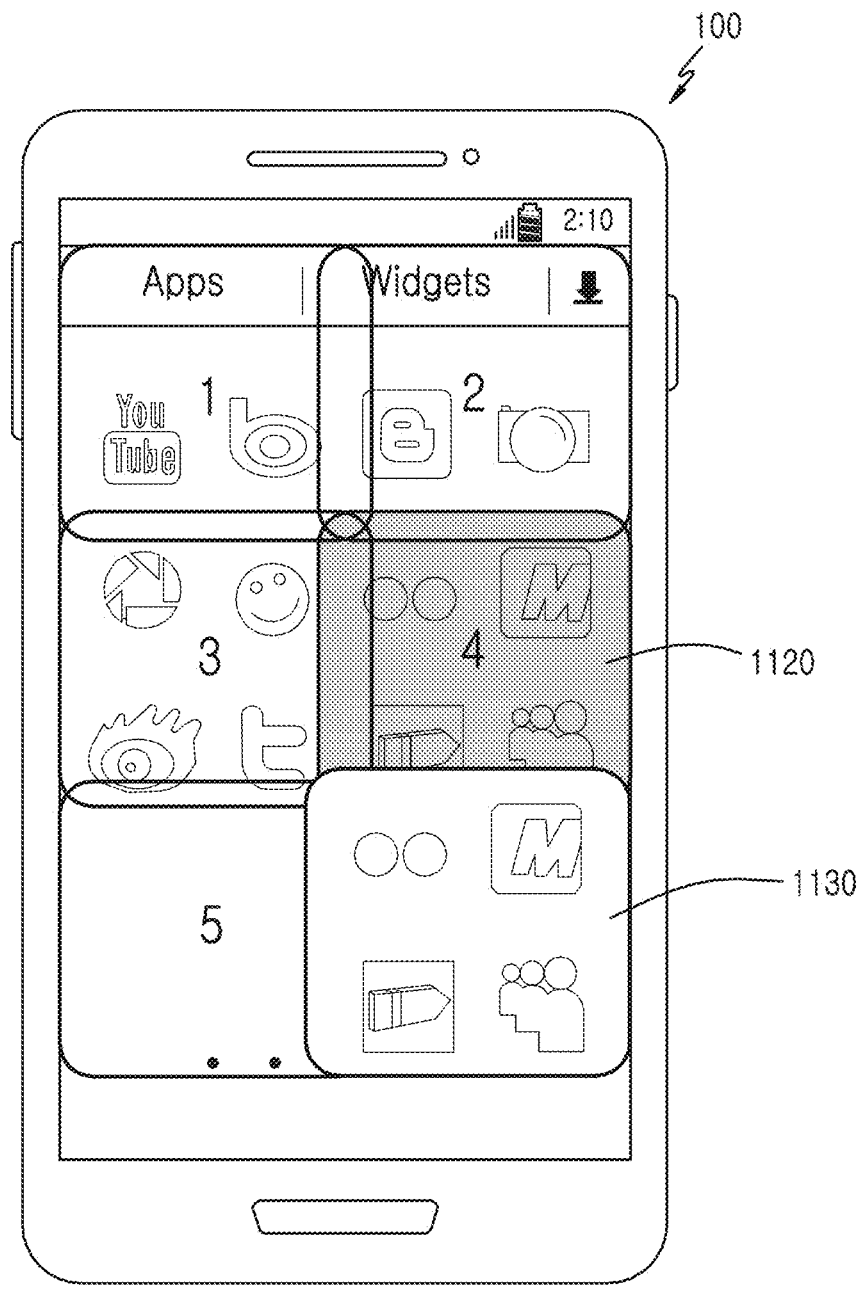

FIGS. 11A, 11B, and 11C are screens for controlling a screen in an electronic device according to an embodiment of the present disclosure.

Referring to FIG. 11A, the electronic device 100 may detect the vertical drag in a certain region 1140 of a mirroring region 1130. The certain region 1140 may include, but not limited to, a right corner region of the mirroring region 1130. Herein, the mirroring region 1130 displays the one selected subscreen 1100.

Referring to FIG. 11B, in operation 1010, the electronic device 100 displays the corresponding subscreen in the mirroring region according to the movement distance of the drag. In so doing, the electronic device 100 may detect the movement distance of the drag. For example, when the movement distance of the drag is shorter than a reference distance, the electronic device 100 may display a second subscreen 1110 in the mirroring region 1130.

Referring to FIG. 11C, when the movement distance of the drag is longer than the reference distance, the electronic device 100 may display a third or fourth subscreen 1120 in the mirroring region 1130. As such, the electronic device 100 may determine the subscreen to display in the mirroring region based on the movement distance of the drag.

The present disclosure has described, but is not limited to, the screen for selecting the application. For example, the electronic device 100 may be operable in the screen where every available application is executed.

Figure 12:
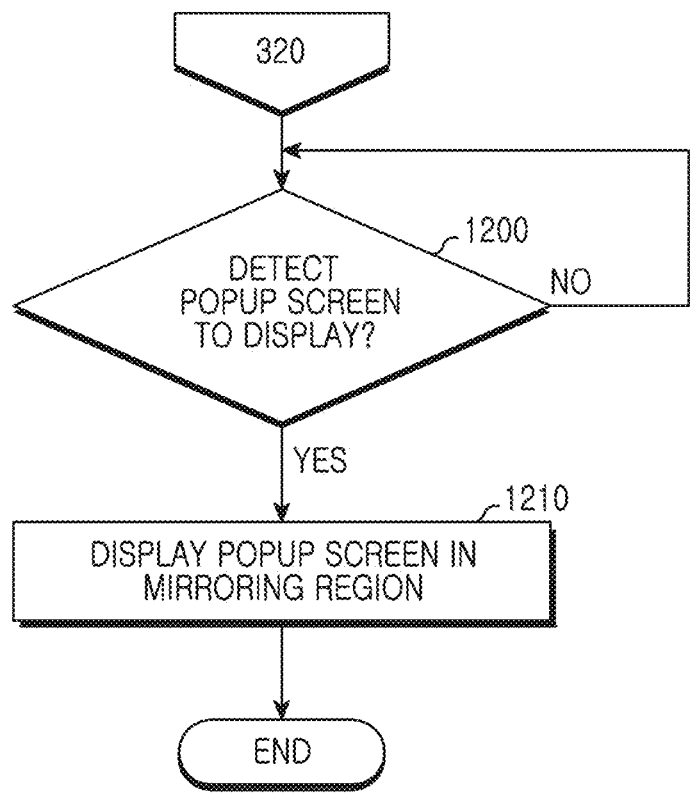
FIG. 12 is a flowchart of a method for controlling a screen in an electronic device according to an embodiment of the present disclosure.

FIG. 12 is a flowchart of a method for controlling a screen in an electronic device according to an embodiment of the present disclosure.

Referring to FIG. 12, the electronic device 100 displays the one selected subscreen in the mirroring region in operation 320 of FIG. 3, and then determines whether a popup screen to display is detected in operation 1200. For example, the popup screen may include, but not limited to, a message notification screen, and may include every content information displayed in the screen.

Figure 13:
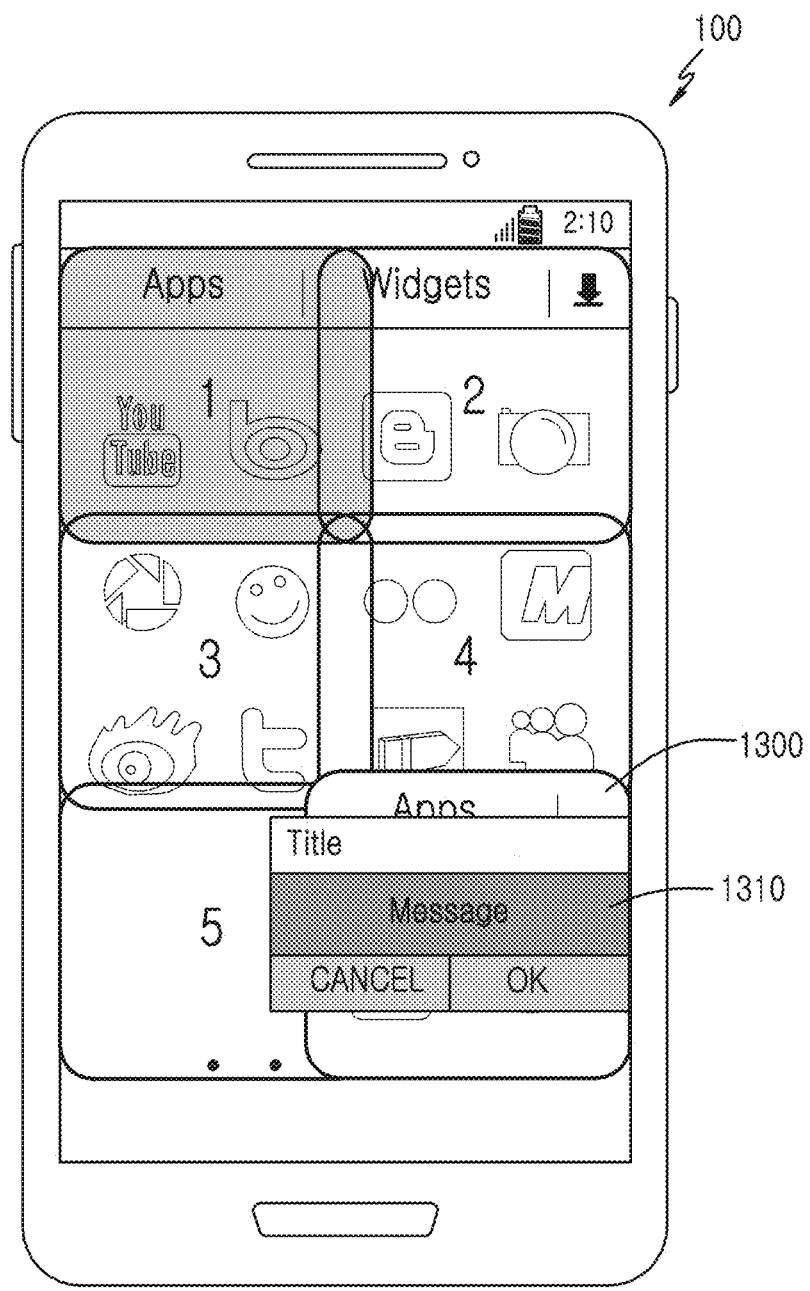
FIG. 13 is a screen for controlling a screen in an electronic device according to an embodiment of the present disclosure.

FIG. 13 is a screen for controlling a screen in an electronic device according to an embodiment of the present disclosure.

Referring to FIG. 13, in operation 1210, the electronic device 100 displays the popup screen in the mirroring region. For example, the electronic device 100 may display a popup screen 1310 in a mirroring region 1300. The popup screen 1310 may be displayed at a certain location of the mirroring region 1300, and the user may set the display location.

The present disclosure has described, but is not limited to, the screen for selecting the application. For example, the electronic device 100 may be operable in the screen where every available application is executed.

As set forth above, the electronic device 100 controls the unreached screen region within the touched screen region using the subscreen, and thus enhances usability for controlling the electronic device 100 with one hand.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
    displaying a plurality of subscreens by dividing a screen, the plurality of subscreens comprising an overlapping region of a certain area with a neighboring subscreen;
    selecting one of the plurality of subscreens;
    displaying the selected one of the plurality subscreens in a mirroring region; and
    displaying, when receiving a user drag from the selected one of the plurality subscreens displayed in the mirroring region to a neighboring screen comprising the overlapping region with the selected one of the plurality subscreens, the neighboring screen comprising the overlapping region with the selected one of the plurality subscreens, in the mirroring region according to the drag.

2. The method of claim 1, further comprising:
    displaying an icon corresponding to another subscreen not displayed in the mirroring region, around the mirroring region;
    selecting the displayed icon; and
    displaying the other subscreen corresponding to the selected icon in the mirroring region.

3. The method of claim 2, wherein the icon comprises label information of the other subscreen.

4. The method of claim 2, wherein the icon is arranged in one of up, down, left, and right sides of the mirroring region based on a location of the other subscreen displayed in the mirroring region.

5. The method of claim 1, further comprising:
    detecting a touch around the mirroring region during a reference time;
    displaying an object corresponding to the plurality of subscreens at the detected touch point;
    selecting the displayed object; and
    displaying the selected one of the plurality of subscreens corresponding to the selected object in the mirroring region.

6. The method of claim 1, further comprising:
    detecting a vertical drag in a certain region of the mirroring region; and
    displaying a corresponding subscreen in the mirroring region according to a movement distance of the detected vertical drag.

7. The method of claim 1, further comprising:
    detecting a popup screen to display; and
    displaying the detected popup screen in the mirroring region.

8. The method of claim 1, wherein the selecting of one of the plurality of subscreens comprises:
    displaying the mirroring region in a certain region of the screen; and
    inputting label information of the selected one of the plurality subscreens through the mirroring region.

9. The method of claim 1, wherein the displaying of the plurality of the plurality of subscreens by dividing the screen comprises:
    identifying an input pattern in a certain region of the screen; and
    determining a size of the plurality of subscreens according to the identified input pattern.

10. The method of claim 1, wherein the plurality of subscreens are determined based on a preset criterion.

11. An electronic device comprising:
    a touch screen;
    a memory; and
    a processor configured:
        to display a plurality of subscreens by dividing a screen, the plurality of subscreens comprising an overlapping region of a certain area with a neighboring subscreen,
        to select one of the plurality of subscreens,
        to display the selected one of the plurality subscreens in a mirroring region, and
        when receiving a user drag from the selected one of the plurality subscreens displayed in the mirroring region to a neighboring screen comprising the overlapping region with the selected one of the plurality subscreens, to display the neighboring screen comprising the overlapping region with the selected one of the plurality subscreens, in the mirroring region according to the drag.

12. The electronic device of claim 11, wherein the processor is further configured:
    to display an icon corresponding to another subscreen not displayed in the mirroring region, around the mirroring region,
    to select the displayed icon, and
    to display the other subscreen corresponding to the selected icon in the mirroring region.

13. The electronic device of claim 12, wherein the icon comprises label information of the other subscreen.

14. The electronic device of claim 12, wherein the processor is further configured to arrange the icon in one of up, down, left, and right sides of the mirroring region based on a location of the other subscreen displayed in the mirroring region.

15. The electronic device of claim 11, wherein the processor is further configured:
    to detect a touch around the mirroring region during a reference time, to display an object corresponding to the plurality of subscreens at the detected touch point, select the displayed object, and to display the selected one of the plurality of subscreens corresponding to the selected object in the mirroring region.

16. The electronic device of claim 11, wherein the processor is further configured:

to detect vertical drag in a certain region of the mirroring region, and to display a corresponding subscreen in the mirroring region according to a movement distance of the detected vertical drag.

17. The electronic device of claim 16, wherein, when the detected vertical drag is less than a reference distance, the processor is further configured to display a second subscreen in the mirroring region, and wherein, when the detected vertical drag is greater than the reference distance, the processor is further configured to display one of a third subscreen and a fourth subscreen in the mirroring region.

18. The electronic device of claim 11, wherein the processor is further configured:

to detect a popup screen to display, and to display the detected popup screen in the mirroring region.

19. The electronic device of claim 11, wherein the processor is further configured:

to display the mirroring region in a certain region of the screen, and to input label information of the selected one of the plurality of subscreens through the mirroring region.

20. The electronic device of claim 11, wherein the processor is further configured:

to identify an input pattern in a certain region of the screen, and to determine a size of the plurality of subscreens according to the identified input pattern.

21. The electronic device of claim 11, wherein the processor is further configured to determine the plurality of subscreens based on a preset criterion.

* * * * *